United States Patent
Hamada et al.

(10) Patent No.: US 10,274,583 B2
(45) Date of Patent: Apr. 30, 2019

(54) VEHICLE-USE COMMUNICATION SYSTEM, VEHICLE-MOUNTED DEVICE, PORTABLE DEVICE, AND A NON-TRANSITORY COMPUTER-READABLE RECORDING MEDIUM

(71) Applicants: AutoNetworks Technologies, Ltd., Yokkaichi, Mie (JP); Sumitomo Wiring Systems, Ltd., Yokkaichi-shi, Mie (JP); Sumitomo Electric Industries, Ltd., Osaka (JP)

(72) Inventors: Yoshihiro Hamada, Osaka (JP); Kenji Matsuoka, Yokkaichi (JP); Hiroyuki Kurata, Yokkaichi (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 311 days.

(21) Appl. No.: 15/315,838

(22) PCT Filed: Jun. 3, 2015

(86) PCT No.: PCT/JP2015/066036
§ 371 (c)(1),
(2) Date: Dec. 2, 2016

(87) PCT Pub. No.: WO2015/186738
PCT Pub. Date: Dec. 10, 2015

(65) Prior Publication Data
US 2017/0192086 A1 Jul. 6, 2017

(30) Foreign Application Priority Data
Jun. 4, 2014 (JP) .................................. 2014-116179

(51) Int. Cl.
*G01S 5/14* (2006.01)
*G01S 5/02* (2010.01)
(Continued)

(52) U.S. Cl.
CPC .............. *G01S 5/14* (2013.01); *B60R 25/245* (2013.01); *G01S 5/02* (2013.01); *G01S 5/0278* (2013.01);
(Continued)

(58) Field of Classification Search
CPC ....... H04W 4/046; H04W 4/40; H04B 17/318
(Continued)

(56) References Cited

U.S. PATENT DOCUMENTS

2004/0203904 A1 10/2004 Gwon et al.
2005/0046568 A1 3/2005 Tanaka
(Continued)

FOREIGN PATENT DOCUMENTS

CN 103576123 A 2/2014
JP 2004215258 A 7/2004
(Continued)

OTHER PUBLICATIONS

English Translation of PCT/JP2015/066036 International Search Report published Dec. 10, 2015.

*Primary Examiner* — Kiet M Doan
(74) *Attorney, Agent, or Firm* — Honigman LLP

(57) ABSTRACT

A vehicle-use communication system suppressing an increase in the number of processes required for various adjustments and the position determination of a portable device is allowed to be accurately performed regardless of whether the portable device is located in the vicinity of a vehicle cabin is provided. An in-vehicle device transmits a signal from a plurality of antennas. A portable device transmits a response signal in accordance with the received (Continued)

signal; measures the received signal strength of the transmitted signal; and transmits a response signal containing the received signal strength of each signal. The in-vehicle device receives the transmitted response signal and on the basis of the received signal strengths contained in the response signals, determines whether the portable device is located within each of a plurality of different domains but containing a common vehicle cabin inner space to determine whether the portable device is located within every domain.

10 Claims, 21 Drawing Sheets

(51) Int. Cl.
  *G01S 11/06* (2006.01)
  *B60R 25/24* (2013.01)
  *H04B 17/318* (2015.01)
  *G07C 9/00* (2006.01)
(52) U.S. Cl.
  CPC ............... *G01S 11/06* (2013.01); *G07C 9/00* (2013.01); *G07C 9/00309* (2013.01); *H04B 17/318* (2015.01); *B60R 25/24* (2013.01); *G07C 2009/00373* (2013.01); *G07C 2009/00404* (2013.01); *G07C 2009/00793* (2013.01); *G07C 2209/63* (2013.01)

(58) Field of Classification Search
  USPC ........... 455/426.1, 426.2, 446, 424; 340/988, 340/5.61
  See application file for complete search history.

(56) References Cited

U.S. PATENT DOCUMENTS

| | | |
|---|---|---|
| 2006/0267407 A1 | 11/2006 | Nagaoka et al. |
| 2008/0048829 A1 | 2/2008 | Nakajima et al. |
| 2012/0040665 A1* | 2/2012 | Liu .................. H04W 4/80 455/426.1 |
| 2014/0045531 A1 | 2/2014 | Kessoku et al. |
| 2017/0052538 A1* | 2/2017 | Li .................. H04B 17/3913 |
| 2017/0105101 A1* | 4/2017 | Santavicca ............. H04B 17/27 |

FOREIGN PATENT DOCUMENTS

| | | |
|---|---|---|
| JP | 2008106577 A | 5/2008 |
| JP | 2008138463 A | 6/2008 |
| JP | 2008266894 A | 11/2008 |
| JP | 2008287574 A | 11/2008 |
| JP | 4483236 B2 | 6/2010 |
| JP | 4673234 B2 | 4/2011 |
| JP | 4673251 B2 | 4/2011 |
| JP | 2013100672 A | 5/2013 |
| JP | 2014086993 A | 5/2014 |

* cited by examiner

VEHICLE-USE COMMUNICATION SYSTEM, VEHICLE-MOUNTED DEVICE, PORTABLE DEVICE, AND A NON-TRANSITORY COMPUTER-READABLE RECORDING MEDIUM

CROSS-REFERENCE TO RELATED APPLICATIONS

This application is the national phase under 35 U. S. C. § 371 of PCT International Application No. PCT/JP2015/066036 which has an International filing date of Jun. 3, 2015 and designated the United States of America. PCT/JP2015/066036 claims priority of Japanese Patent Application No. 2014-116179 filed Jun. 4, 2014.

FIELD

The present patent disclosure relates to: a vehicle-use communication system; an in-vehicle device and a portable device constituting the vehicle-use communication system; and a computer program.

BACKGROUND

A vehicle-use communication system is in practical use in which locking or unlocking of a vehicle door is achieved without the use of a mechanical key. Specifically, such systems in practical use include: a keyless entry system in which locking or unlocking of a vehicle door is achieved by wireless remote operation by using a portable device owned by a user; and a smart entry (registered trademark) system in which a vehicle door is unlocked when a user having a portable device merely approaches the vehicle or merely grips the door handle.

Further, a vehicle-use communication system is also in practical use in which engine start in a vehicle is achieved without the use of a mechanical key. Specifically, a smart start system is in practical use in which the engine is started when a user having a portable device merely pushes an engine start button.

In the communication systems described above, the in-vehicle device performs communication with the portable device by using radio signals so as to perform authentication and, after that, perform control concerning the given operation of unlocking, locking, engine start, or the like. However, for the purpose of preventing unauthorized operation, before the operation is executed, it is checked whether the portable device is located at a given position. As methods of checking the position of the portable device, methods described in Japanese Patent No. 4483236, Japanese Patent No. 4673234 and Japanese Patent No. 4673251 or the like are known.

Japanese Patent No. 4483236 discloses a position detection method in which a signal is transmitted from an antenna for vehicle cabin inside and an antenna for vehicle cabin outside to the inside and the outside of the vehicle cabin and then the position of the portable device is determined on the basis of which signal triggers a response from the portable device.

Japanese Patent No. 4673234 discloses a keyless entry apparatus in which a portable device receives signals transmitted from a plurality of antennas provided on a vehicle and then the position of the portable device is determined on the basis of the received signal strengths of the signals received by the portable device. The in-vehicle device according to Japanese Patent No. 4673234 stores, in advance, data required for determination of the position of the portable device.

Specifically, the portable device is arranged at a plurality of locations along the inner side of the vehicle cabin inside-outside boundary and then the portable device receives signals for received signal strength measurement (for portable device position determination) transmitted from the plurality of transmitting antennas connected to the in-vehicle device so as to measures the received signal strengths of the signals. Similarly, the portable device is arranged at a plurality of locations along the outer side of the vehicle cabin inside-outside boundary and then the portable device receives signals for received signal strength measurement transmitted from the plurality of transmitting antennas connected to the in-vehicle device so as to measures the received signal strengths of the signals. Then, the in-vehicle device stores in advance: the vehicle-cabin inside data group containing a plurality of received signal strengths measured in a state that the portable device follows the inner side of the vehicle cabin inside-outside boundary; and the vehicle-cabin outside data group containing a plurality of received signal strengths measured in a state that the portable device follows the outer side of the vehicle cabin inside-outside boundary.

At the time of operation of the keyless entry system, the portable device measures the received signal strengths of the signals transmitted from the plurality of transmitting antennas and then transmits the measured received signal strengths to the in-vehicle device. The in-vehicle device receives the received signal strengths transmitted from the portable device and then, on the basis of the Mahalanobis distance, determines whether the received signal strengths measured by the portable device are closer to the vehicle-cabin inside data group or the vehicle-cabin outside data group. If the received signal strengths are closer to the vehicle-cabin inside data group, the in-vehicle device determines that the portable device is located in the inside of the vehicle cabin. Further, if the received signal strengths are closer to the vehicle-cabin outside data group, it is determined that the portable device is located in the outside of the vehicle cabin.

Japanese Patent No. 4673251 discloses a keyless entry apparatus having a similar configuration to Japanese Patent No. 4673234. In the keyless entry apparatus according to Japanese Patent No. 4673251, whether the portable device is located in the vicinity of the vehicle cabin inside-outside boundary is determined by using received signal strengths measured by the portable device. If the received signal strengths fall within a given interval, the portable device is determined as being located in the vicinity of the vehicle cabin inside-outside boundary and then the position determination of the portable device is performed similarly to Japanese Patent No. 4673234. If the received signal strengths go outside the given interval, the portable device is determined as being distant from the vehicle cabin inside-outside boundary and then the position determination of the portable device is performed on the basis of the magnitude of the received signal strength.

SUMMARY OF INVENTION

However, in order that the position determination of the portable device may be accurately performed by using the method of Japanese Patent No. 4483236, the physical strengths of the signals transmitted from the antenna for vehicle cabin inside and the antenna for vehicle cabin outside are required to be adjusted such that the outside and the inside are clearly distinguished on the inside-outside boundary of the vehicle. This causes a problem of physical difficulty in the adjustment.

Further, in Japanese Patent No. 4673234, the position determination of the portable device is performed by using the vehicle-cabin inside data group and the vehicle-cabin outside data group of the received signal strengths measured by a method that the portable device is arranged along the inner side and the outer side of the vehicle cabin inside-outside boundary. Thus, there is a problem that when the portable device departs from the vehicle cabin inside-outside boundary, the accuracy of position determination of the portable device is degraded.

Further, in Japanese Patent No. 4673251, the position determination method for the portable device is switched depending on whether the received signal strengths measured by the portable device fall within the given interval. However, in some cases, erroneous selection of the position determination method may be caused by fluctuations in the received signal strengths. This causes a problem that when such erroneous selection of the position determination method is caused, the accuracy of position determination of the portable device is degraded.

An object of the present patent disclosure is to provide: a vehicle-use communication system in which in the position determination of a portable device performed such that the portable device receives signals transmitted from a plurality of antennas provided on a vehicle side and then the position determination is achieved on the basis of the received signal strengths of the signals measured by the portable device, an increase in the number of processes required for various adjustments is allowed to be suppressed and the position determination of the portable device is allowed to be accurately performed regardless of whether the portable device is located in the vicinity of the vehicle cabin inside-outside boundary; an in-vehicle device and a portable device constituting the vehicle-use communication system; and a computer program.

The vehicle-use communication system according to an aspect of the present disclosure is a vehicle-use communication system including: an in-vehicle device transmitting a signal from a plurality of antennas provided on a vehicle; and a portable device receiving the signal transmitted from the in-vehicle device and then transmitting a response signal in accordance with the received signal, wherein the portable device includes: a measurement part measuring the received signal strength of the signal transmitted from each of the plurality of antennas; and a transmitting part transmitting a response signal containing the received signal strength of each signal measured by the measurement part, and wherein the in-vehicle device includes: an in-vehicle receiving part receiving the response signal transmitted from the portable device; a domain inside-or-outside determination part, on the basis of the received signal strengths contained in the response signals received by the in-vehicle receiving part, determining whether the portable device is located within each of a plurality of domains different from each other but each containing a common vehicle cabin inner space; and a determination part determining whether the portable device is located within every domain.

The in-vehicle device according to an aspect of the present disclosure is an in-vehicle device transmitting a signal from a plurality of antennas provided on a vehicle and then receiving a response signal transmitted from an external equipment in accordance with the signal, including: an in-vehicle receiving part receiving the response signals containing received signal strengths of the signals individually transmitted from the plurality of antennas measured at the external equipment; a domain inside-or-outside determination part, on the basis of the received signal strengths contained in the response signals received by the in-vehicle receiving part, determining whether the external equipment is located within each of a plurality of domains different from each other but each containing a common vehicle cabin inner space; and a determination part determining whether the external equipment is located within every domain.

The portable device according to an aspect of the present disclosure is a portable device receiving a plurality of signals transmitted from a vehicle and then transmitting response signals in accordance with the received signals, including: a measurement part measuring received signal strengths of the plurality of signals; a domain inside-or-outside determination part, on the basis of the received signal strengths measured by the measurement part, determining whether itself is located within each of a plurality of domains different from each other but each containing a common vehicle cabin inner space; and a determination part determining whether itself is located within every domain.

The computer program according to an aspect of the present disclosure is a computer program causing a computer to, on the basis of the received signal strengths of signals transmitted from a plurality of antennas provided on a vehicle and then received by a portable device, determine whether the portable device is located in the inside of the vehicle cabin, wherein the computer is caused to serve as: a domain inside-or-outside determination part, on the basis of the received signal strengths, determining whether the portable device is located within each of a plurality of domains different from each other but each containing a common vehicle cabin inner space; and a determination part determining whether the portable device is located within every domain.

Here, in addition to a configuration that the present patent disclosure is implemented as a vehicle-use communication system, an in-vehicle device, and a portable device employing such a characteristic processing part, the present patent disclosure may be implemented as a vehicle communication method employing steps of such characteristic processing or, alternatively, as a program causing a computer to execute these steps. Further, the present patent disclosure may be implemented as an integrated circuit used for realizing a part or all of the vehicle-use communication system, the in-vehicle device, and the portable device or, alternatively, as any other system including the vehicle-use communication system, the in-vehicle device, and the portable device.

As described above, allowed to be provided are: a vehicle-use communication system in which in the position determination of a portable device performed such that the portable device receives signals transmitted from a plurality of antennas provided on a vehicle side and then the position determination is achieved on the basis of the received signal strengths of the signals measured by the portable device, an increase in the number of processes required for various adjustments is allowed to be suppressed and the position determination of the portable device is allowed to be accurately performed regardless of whether the portable device is located in the vicinity of the vehicle cabin inside-outside boundary; and an in-vehicle device and a portable device constituting the vehicle-use communication system.

The above and further objects and features will more fully be apparent from the following detailed description with accompanying drawings.

DETAILED DESCRIPTION

Description of Embodiments of Present Disclosure

Figure 1:
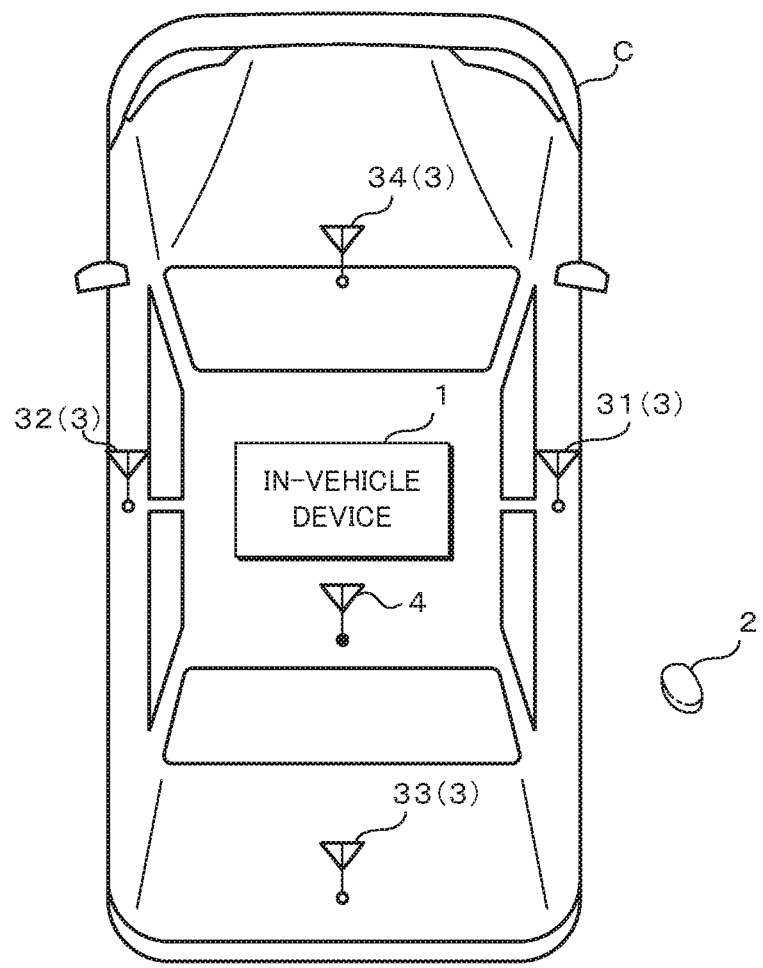
FIG. 1 is a block diagram illustrating an exemplary configuration of a vehicle-use communication system according to Embodiment 1.

First, aspects of the present disclosure are listed and described below. Further, at least a part of the aspects described below may arbitrarily be combined with each other.

(1) The vehicle-use communication system according to an aspect of the present disclosure is a vehicle-use communication system including; an in-vehicle device transmitting a signal from a plurality of antennas provided on a vehicle; and a portable device receiving the signal transmitted from the in-vehicle device and then transmitting a response signal in accordance with the received signal, wherein the portable device includes: a measurement part measuring the received signal strength of the signal transmitted from each of the plurality of antennas; and a transmitting part transmitting a response signal containing the received signal strength of each signal measured by the measurement part, and wherein the in-vehicle device includes: an in-vehicle receiving part receiving the response signal transmitted from the portable device; a domain inside-or-outside determination part, on the basis of the received signal strengths contained in the response signals received by the in-vehicle receiving part, determining whether the portable device is located within each of a plurality of domains different from each other but each containing a common vehicle cabin inner space; and a determination part determining whether the portable device is located within every domain.

In the present patent disclosure, the in-vehicle device transmits a signal from the plurality of antennas provided on the vehicle. The signal is a signal used for determining the position of the portable device. The portable device receives the signal transmitted from each antenna, then measures the received signal strength of each signal, and then transmits to the in-vehicle device a response signal containing the received signal strength obtained by the measurement. The received signal strength of each signal varies depending on the position of the portable device relative to the vehicle.

The in-vehicle device receives the response signal transmitted from the portable device. The domain inside-or-outside determination part of the in-vehicle device determines whether the portable device is located within each of the plurality of domains different from each other. In the following description, the determination performed by the domain inside-or-outside determination part is referred to as inside-or-outside determination. Each of the plurality of domains contains a common vehicle cabin inner space. Then, a part of the boundary of each domain accurately follows a part of the boundary of a domain on which the inside-or-outside determination is to be performed. However, the boundary of each domain does not completely agree with the boundary of the vehicle cabin inner space. Thus, the number of processes required for generation of parameters used for determining whether the portable device is located on the inner side or the outer side of the boundary in each domain is suppressed.

The determination part of the present patent disclosure determines whether the portable device is located within every domain. For example, in a case that the portable device is located within the common vehicle cabin inner space, it is determined that the portable device is located within every one of the plurality of domains in the inside-or-outside determination. In a case that the portable device is located on the outer side of the common vehicle cabin inner space, it is determined that the portable device is located on the outer side of at least one domain among the plurality of domains. The plurality of domains are generated such that all domains having been combined with each other accurately follow the boundary of the domain on which determination of whether the portable device is located within or without the vehicle cabin is to be performed. Thus, in the domain on which determination is to be performed, whether the portable device is located on the inner side or the outer side is allowed to be accurately determined. In the following description, the determination of the position of the portable device performed by the determination part is referred to as vehicle cabin inside-or-outside determination.

Here, the vehicle cabin inner space of the present patent disclosure is not required to completely agree with the space of the vehicle cabin and is not required to completely contain the entirety of the vehicle cabin.

Further, the vehicle cabin inside-or-outside determination of the portable device is not required to be accurately performed on the entirety of the inside-outside boundary of the vehicle cabin inner space. That is, as long as a problem is not caused, an aspect that the vehicle cabin inside-or-outside determination is performed with less accuracy on a part of the inside-outside boundary may also be contained in the aspect of the present patent disclosure.

(2) A configuration is preferable that at least one of the plurality of domains has a boundary that is along a part of an inner surface of the vehicle cabin.

In the present patent disclosure, at least one of the plurality of domains has a boundary that follows a part of the inner surface of the vehicle cabin. Thus, when the inside-or-outside determination of the portable device is performed in the domain, the vehicle cabin inside-or-outside determination in at least a part of neighborhood of the inner surface is accurately performed in comparison with other part.

Here, the boundary is not required to completely agree with the inner surface of the vehicle cabin. For example, the boundary may be located in the inside of the side wall constituting the vehicle cabin or, alternatively, may be a surface along the outer surface of the side wall.

(3) The in-vehicle device includes a storage part storing: a first statistical value based on a sample group of the received signal strengths measured at a plurality of locations along a part of the inner surface and on a sample group of the received signal strengths measured at a plurality of locations along an outer surface of the vehicle cabin; and a second statistical value based on a sample group of the received signal strengths measured at a plurality of locations along an outer surface of the part, and wherein the domain inside-or-outside determination part, on the basis of the received signal strengths contained in the response signals received by the in-vehicle receiving part and on the basis of the first statistical value and the second statistical value stored in the storage part, determines whether the portable device is located within the domain.

In the present patent disclosure, whether the portable device is located within the domain is determined by using the first statistical value and the second statistical value.

The first statistical value is a value calculated on the basis of the sample group of the received signal strengths measured at a plurality of locations along the a part of the inner surface and on the sample group of the received signal strengths measured at a plurality of locations along the outer surface of the vehicle cabin. Among the sample groups used for calculation of the first statistical value, the sample group of the received signal strengths measured at a plurality of locations along the outer surface of the vehicle cabin is used for ensuring that every one of the domains contains the common vehicle cabin inner space. Further, among the sample groups used for calculation of the first statistical value, the sample group of the received signal strengths measured at a plurality of locations along the part of the inner surface is used for setting forth a boundary corresponding to the part of the inner surface such that the vehicle cabin inside-or-outside determination in the part of the inner surface may be allowed to be accurately performed.

The second statistical value is a value calculated on the basis of the sample group of the received signal strengths measured at a plurality of locations along the outer surface of the part. The sample group used for calculation of the second statistical value is used for setting forth a boundary of a domain corresponding to the part such that the vehicle cabin inside-or-outside determination in the part of the inner surface may be allowed to be accurately performed.

Since the sample groups described above are utilized as the sample groups for calculating the first statistical value and the second statistical value, the number of processes required for generation of the statistical value used for the inside-or-outside determination of the portable device in the domains is effectively suppressed in comparison with a case that a huge sample group generated at random is employed.

(4) A configuration is preferable that the first statistical value is based on a sample group of the received signal strengths measured at a plurality of locations along a part of the inner surface and based on a sample group of the received signal strengths measured at a plurality of locations along an inner surface and an outer surface of the other part that opposes the part of the inner surface.

In the present patent disclosure, whether the portable device is located within the domain is determined by using the first statistical value and the second statistical value.

The first statistical value is a value calculated on the basis of the sample group of the received signal strengths measured at a plurality of locations along the part of the inner surface and on the basis of the sample group of the received signal strengths measured at a plurality of locations along the inner surface and the outer surface of the other part that opposes the part of the inner surface. Among the sample groups used for calculation of the first statistical value, the sample group of the received signal strengths measured at a plurality of locations along the inner surface and the outer surface of the other part is used for ensuring that every one of the domains contains the other part. Further, among the sample groups used for calculation of the first statistical value, the sample group of the received signal strengths measured at a plurality of locations along the part of the inner surface is used for setting forth a boundary corresponding to the part of the inner surface such that the vehicle cabin inside-or-outside determination in the part of the inner surface may be allowed to be accurately performed.

The second statistical value is a value calculated on the basis of the sample group of the received signal strengths measured at a plurality of locations along the outer surface of the part. The sample group used for calculation of the second statistical value is used for setting forth a boundary of a domain corresponding to the part such that the vehicle cabin inside-or-outside determination in the part of the inner surface may be allowed to be accurately performed.

Since the sample groups described above are utilized as the sample groups for calculating the first statistical value and the second statistical value, the number of processes required for generation of the statistical value used for the inside-or-outside determination of the portable device in the domains is effectively suppressed in comparison with a case that a huge sample group generated at random is employed.

(5) A configuration is preferable that the first statistical value and the second statistical value include a mean and an inverse variance-covariance matrix of the received signal strengths, wherein the in-vehicle device includes a distance calculation part calculating: a statistical distance between the received signal strengths contained in the response signals received by the in-vehicle receiving part and the sample group concerning the first statistical value; and a statistical distance between the received signal strengths contained in the response signals received by the in-vehicle receiving part and the sample group concerning the second statistical value, and wherein the domain inside-or-outside determination part compares these statistical distances with each other so as to determine whether the portable device is located within the domain.

According to the present patent disclosure, by using the first statistical value, the in-vehicle device calculates a statistical distance between the sample group characterizing the inner side of the domain and the received signal strengths measured by the portable device. Further, by using the second statistical value, the in-vehicle device calculates a statistical distance between the sample group characterizing the outer side of the domain and the received signal strengths measured by the portable device. The domain inside-or-outside determination part of the in-vehicle device compares the calculated statistical distances with each other so as to determine whether the portable device is located within or without the domain. If the statistical distance from the sample group characterizing the inner side of the domain is shorter than the statistical distance from the sample group characterizing the outer side of the domain, it is determined that the portable device is located within the domain. In contrast, if the statistical distance from the sample group characterizing the outer side of the domain is shorter than the statistical distance from the sample group characterizing the inner side of the domain, it is determined that the portable device is located on the outer side of the domain.

(6) A configuration is preferable that the in-vehicle device includes a storage part storing a discriminant for discriminating from each other: the received signal strengths measured by the measurement part of the portable device located within the domain; and the received signal strengths measured by the measurement part of the portable device located on the outer side of the domain, and wherein the domain inside-or-outside determination part, on the basis of the received signal strengths contained in the response signals received by the in-vehicle receiving part and on the basis of the discriminant stored in the storage part, determines whether the portable device is located within the domain.

According to the present patent disclosure, by using the discriminant stored in the storage part, the portable device determines whether the in-vehicle device is located within or without the domain. Each of the plurality of domains is insufficient for determining whether the portable device is located within or without the vehicle cabin inner space. However, since the accuracy of the boundary of the domain is low, the number of processes required for generation of the discriminant setting forth the domain is suppressed. For example, the discriminant is allowed to be generated by employing an approximation formula constructed from a low-order polynomial setting forth the boundary of the domain.

More specifically, in the discriminant in the present patent disclosure, a plurality of points where the statistical distance from the vehicle-cabin inside sample group and the statistical distance from the vehicle-cabin outside sample group become equal to each other are acquired and adopted as the whole set. Here, the vehicle-cabin inside sample group contains the sample group of the received signal strengths measured at a plurality of locations along a part of the inner surface of the vehicle cabin. Further, the vehicle-cabin outside sample group contains the sample group of the received signal strengths measured at a plurality of locations along the outer surface of the part.

Then, a subset contributing to the inside-or-outside determination of the portable device is extracted from the whole set and then an approximated curve expressing the subset is acquired by using the extracted subset by the least square method.

For example, in a case that two-dimensional samples each containing the received signal strengths of signals transmitted from two antennas are employed, the points where the statistical distance from the vehicle-cabin inside sample group and the statistical distance from the vehicle-cabin outside sample group become equal to each other are allowed to be plotted on a two-dimensional plane. Then, the shape thereof becomes a hyperbola, a parabola, or an ellipse. A combination of antennas in which the shape described here becomes an ellipse is not employed. Then, for example, in a case that the shape is a hyperbola, a subset constructed from a plurality of points located on a curve contributing to the inside-or-outside determination of the portable device is extracted. Since the shape of the curve expressing the subset becomes a parabola, accurate approximation is allowed to be achieved by using a low-order polynomial by the least square method.

In the present discriminant, it is sufficient that the received signal strengths are measured in the inside and the outside in the vicinity of the boundary of the domain. Thus, the number of processes required for generation of parameters used for determining whether the portable device is located within or without the boundary in each domain is suppressed.

Here, the particular example of the discriminant described here is exemplary and hence the generation method and the dimension of the discriminant employed in the present patent disclosure are not limited to particular ones.

(7) A configuration is preferable that at least one of the plurality of domains has a boundary that is along the right inner surface of the vehicle cabin and one of the other domains has a boundary that is along the left inner surface of the vehicle cabin.

According to the present patent disclosure, since a domain having a boundary that follows the right inner surface of the vehicle cabin and a domain having a boundary that follows the left inner surface are employed, the vehicle cabin inside-or-outside determination of the portable device is allowed to be accurately performed in the right side face and the left side face of the vehicle cabin. Here, the boundary of each domain is not required to completely agree with the right side face and the left side face of the vehicle cabin.

(8) A configuration is preferable that at least one of the plurality of domains has a boundary that is along the inner surface on the rear side of the vehicle cabin.

According to the present patent disclosure, since each domain having a boundary that follows the inner surface on the rear side of the vehicle cabin is employed, the vehicle cabin inside-or-outside determination of the portable device in the rear face of the vehicle cabin is allowed to be accurately performed. Here, the boundary of the domain is not required to completely agree with the rear face of the vehicle cabin.

(9) A configuration is preferable that at least one of the plurality of domains has a boundary that is along the inner surface on the front side of the vehicle cabin.

According to the present patent disclosure, since each domain having a boundary that follows the inner surface on the front side of the vehicle cabin is employed, the vehicle cabin inside-or-outside determination of the portable device in the front face of the vehicle cabin is allowed to be accurately performed. Here, the boundary of the domain is not required to completely agree with the front face of the vehicle cabin.

(10) A configuration is preferable that the domain inside-or-outside determination part is constructed such as to, on the basis of a part of the received signal strengths contained in the response signals received by the in-vehicle receiving part, determine whether the portable device is located within the domain, the received signal strengths employed in the determination being different for each of the plurality of domains.

According to the present patent disclosure, on the basis of a part of the received signal strengths measured by the portable device, the domain inside-or-outside determination part determines whether the portable device is located within or without the domain. In general, the received signal strength required for effectively performing the inside-or-outside determination of the portable device in the domain varies depending on each domain. Thus, the domain inside-or-outside determination part performs the inside-or-outside determination of the portable device by employing received signal strengths different depending on each domain. When the number of received signal strengths employed in the inside-or-outside determination of the portable device in each domain is suppressed, the number of processes required for generation of the data setting forth the domain, that is, of the data required for determining whether the portable device is located within or without the domain, is allowed to be suppressed without degradation in the accuracy of the vehicle cabin inside-or-outside determination of the portable device.

(11) The in-vehicle device according to an aspect of the present disclosure is an in-vehicle device transmitting a signal from a plurality of antennas provided on a vehicle and then receiving a response signal transmitted from an external equipment in accordance with the signal, including; an in-vehicle receiving part receiving the response signals containing received signal strengths of the signals individually transmitted from the plurality of antennas measured at the external equipment; a domain inside-or-outside determination part, on the basis of the received signal strengths contained in the response signals received by the in-vehicle receiving part, determining whether the external equipment is located within each of a plurality of domains different from each other but each containing a common vehicle cabin inner space; and a determination part determining whether the external equipment is located within every domain.

In the present patent disclosure, the in-vehicle device transmits a signal from the plurality of antennas provided on the vehicle. Then, the in-vehicle device receives the response signals containing received signal strengths of the signals individually transmitted from the plurality of antennas measured at the external equipment.

The domain inside-or-outside determination part of the in-vehicle device determines whether the external equipment is located within each of the plurality of domains different from each other. Each of the plurality of domains contains a common vehicle cabin inner space. Then, a part of the boundary of each domain accurately follows a part of the boundary of a domain on which the vehicle cabin inside-or-outside determination is to be performed. However, the boundary of each domain does not completely agree with the boundary of the vehicle cabin inner space. Thus, similarly to aspect (1), the number of processes required for generation of parameters used for determining whether the portable device is located on the inner side or the outer side of the boundary in each domain is suppressed.

The determination part of the present patent disclosure determines whether the external equipment is located within every domain. For example, in a case that the external equipment is located within the common vehicle cabin inner space, it is determined that the external equipment is located within every one of the plurality of domains in the determination. In a case that the external equipment is located on the outer side of the common vehicle cabin inner space, it is determined that the external equipment is located on the outer side of at least one domain among the plurality of domains. The plurality of domains are generated such that all domains having been combined with each other accurately follow the boundary of the domain on which the vehicle cabin inside-or-outside determination is to be performed. Thus, in the domain on which the vehicle cabin inside-or-outside determination is to be performed, whether the external equipment is located on the inner side or the outer side is allowed to be accurately determined.

(12) The portable device according to an aspect of the present disclosure is a portable device receiving a plurality of signals transmitted from a vehicle and then transmitting response signals in accordance with the received signals, including: a measurement part measuring received signal strengths of the plurality of signals; a domain inside-or-outside determination part, on the basis of the received signal strengths measured by the measurement part, determining whether itself is located within each of a plurality of domains different from each other but each containing a common vehicle cabin inner space; and a determination part determining whether itself is located within every domain.

In the present patent disclosure, the measurement part measures the received signal strengths of the plurality of signals transmitted from the vehicle. The domain inside-or-outside determination part of the portable device determines whether itself is located within each of the plurality of domains different from each other. Each of the plurality of domains contains a common vehicle cabin inner space. However, the boundary of each domain does not completely agree with the boundary of the vehicle cabin inner space. Thus, similarly to aspect (1), the number of processes required for generation of the data required for determining whether the portable device is located within or without the domain, is suppressed.

The determination part of the portable device determines whether itself is located within every domain. If the portable device is located within the vehicle cabin inner space, the portable device is determined as being located within every domain. When the inside-or-outside determination of the portable device is performed in each of the plurality of domains, whether the portable device is located within or without the vehicle cabin inner space is allowed to be accurately determined in comparison with a case that one domain is employed.

(13) The computer program according to an aspect of the present disclosure is a computer program causing a computer to, on the basis of the received signal strengths of signals transmitted from a plurality of antennas provided on a vehicle and then received by a portable device, determine whether the portable device is located in the inside of the vehicle cabin, wherein the computer is caused to serve as: a domain inside-or-outside determination part, on the basis of the received signal strengths, determining whether the portable device is located within each of a plurality of domains different from each other but each containing a common vehicle cabin inner space; and a determination part determining whether the portable device is located within every domain.

On the basis of the received signal strengths of the signals transmitted from the plurality of antennas provided on a vehicle and then received by the portable device, the computer determines whether the portable device is located within each of the plurality of domains different from each other. Each of the plurality of domains contains a common vehicle cabin inner space. However, the boundary of each domain does not completely agree with the boundary of the vehicle cabin inner space. Thus, similarly to aspect (1), the number of processes required for generation of the data required for determining whether the portable device is located within or without the domain, is suppressed.

The computer determines whether the portable device is located within every domain. If the portable device is located within the vehicle cabin inner space, the portable device is determined as being located within every domain. When the inside-or-outside determination of the portable device is performed in each of the plurality of domains, whether the portable device is located within or without the vehicle cabin inner space is allowed to be accurately determined in comparison with a case that one domain is employed.

Details of Embodiments of Present Disclosure

It is to be noted that, as used herein and in the appended claims, the singular forms "a", "an", and "the" include plural referents unless the context clearly dictates otherwise.

Particular examples of the vehicle-use communication system according to embodiments of the present invention are described below with reference to the drawings. Here, the present invention is not limited to these examples and is defined by the scope of the claims and intended to include all changes within the scope of the claims and the scope or the meaning equivalent thereto.

Embodiment 1

FIG. 1 is a block diagram illustrating an exemplary configuration of a vehicle-use communication system according to Embodiment 1. The vehicle-use communication system according to the present Embodiment 1 includes: an in-vehicle device 1 transmitting and receiving various signals through a plurality of transmitting antennas (3) and a receiving antenna 4 provided on a vehicle C; and a portable device 2 transmitting and receiving signals to and from the in-vehicle device 1.

For example, the plurality of transmitting antennas (3) includes: a first transmitting antenna 31 provided in a pillar on the driver side; a second transmitting antenna 32 provided in a pillar on the passenger side; a third transmitting antenna 33 provided in a back door; and a fourth transmitting antenna 34 provided in a front part of the vehicle C. The receiving antenna 4 is provided at an appropriate location of the vehicle C. Here, in the present Embodiment 1, the right side in the traveling direction of the vehicle C corresponds to the driver side and the left side in the traveling direction corresponding to the passenger side.

The in-vehicle device 1 successively transmits a signal used for determining the position of the portable device 2, as a radio signal from the plurality of transmitting antennas (3). The portable device 2 receives the signal transmitted from each transmitting antenna (3) and then measures the received signal strength of each received signal. The portable device 2 transmits a response signal containing the measured received signal strength, as a radio signal to the in-vehicle device 1. The in-vehicle device 1 receives each response signal transmitted from the portable device 2 and then, on the basis of the received signal strengths contained in the received response signals, performs vehicle cabin inside-or-outside determination of the portable device 2. After that, the in-vehicle device 1 executes given processing corresponding to the determination result. For example, the in-vehicle device 1 executes the processing of locking or unlocking of a vehicle door, engine start, warning of a locking failure in a vehicle door, or the like.

Figure 2:
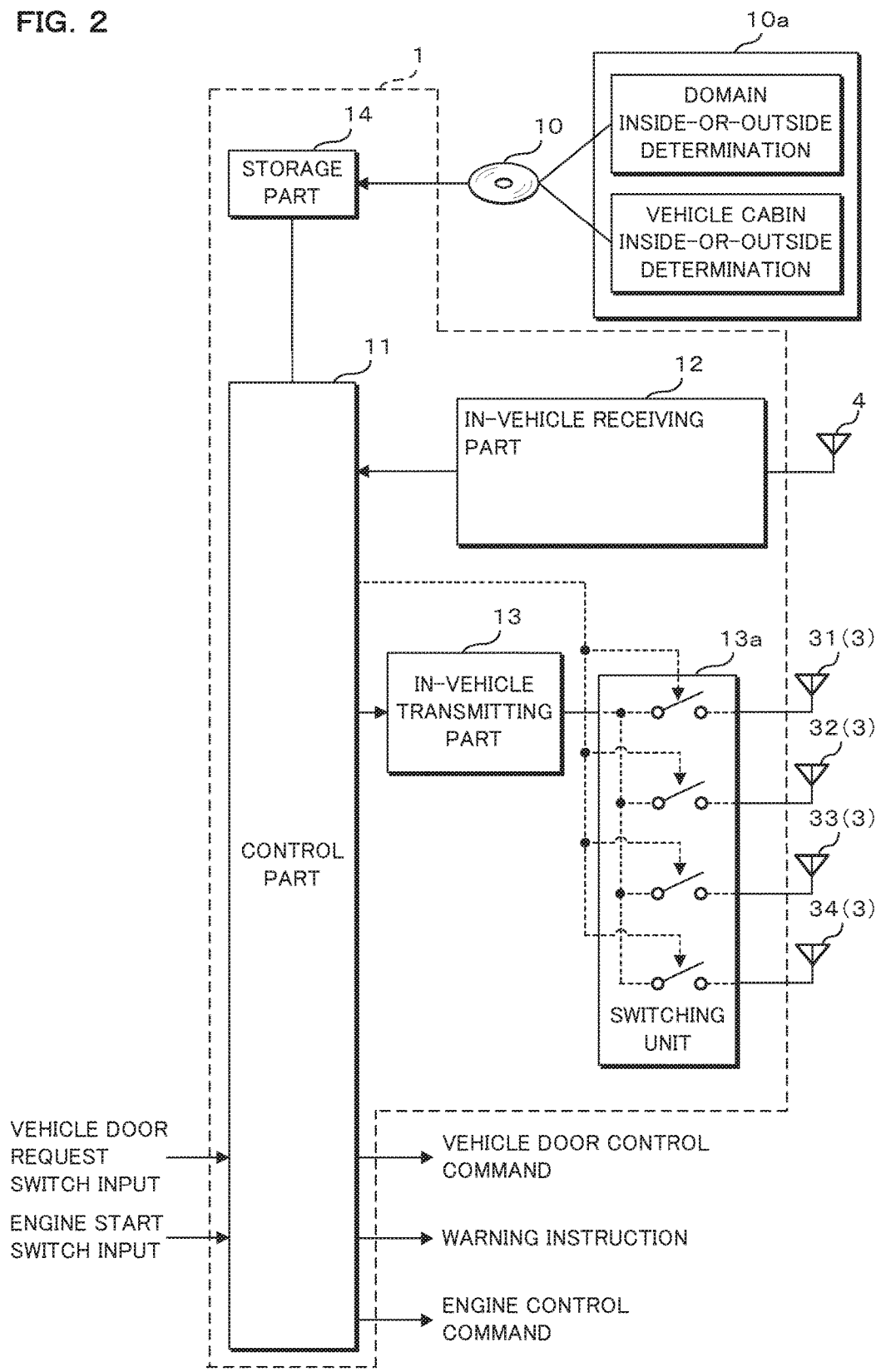
FIG. 2 is a block diagram illustrating an exemplary configuration of an in-vehicle device.

FIG. 2 is a block diagram illustrating an exemplary configuration of the in-vehicle device 1. The in-vehicle device 1 includes a control part 11 controlling the operation of each constituting part of the in-vehicle device 1. The control part 11 includes an in-vehicle receiving part 12, a in-vehicle transmitting part 13, a switching unit 13a, and a storage part 14.

For example, the control part 11 is constructed from a microcomputer including one or a plurality of CPUs (Central Processing Units), multi-core CPUs, ROMs (Read Only Memories), RAMs (Random Access Memories), input/output interfaces, timers, and the like. The CPU of the control part 11 is connected through the input/output interface to the in-vehicle receiving part 12, the in-vehicle transmitting part 13, and the storage part 14. The control part 11 executes a later-described computer program 10a stored in the storage part 14 so as to control the operation of each constituting part and thereby executes vehicle cabin inside-or-outside determination of the portable device 2 and given processing corresponding to the vehicle cabin inside-or-outside determination.

The storage part 14 is constructed from a non-volatile memory such as an EEPROM (Electrically Erasable Programmable ROM) and a flash memory. The storage part 14 stores a computer program 10a used for operation that the control part 11 controls the operation of each constituting part of the in-vehicle device 1 so as to execute the vehicle cabin inside-or-outside determination of the portable device 2. Further, the storage part 14 stores also various statistical values used for the vehicle cabin inside-or-outside determination of the portable device 2. Details of the statistical values are described later. Here, in FIG. 2, the control part 11 and the storage part 14 are illustrated as separate constituting parts from each other. Instead, the storage part 14 may be provided in the inside of the control part 11.

The computer program 10a according to the present Embodiment 1 may be in the form of being recorded in a recording medium 10 in a computer readable manner. Then, the storage part 14 stores the computer program 10a having been read from the recording medium 10 by a reading device (not illustrated). The recording medium 10 is constructed from: an optical disc such as a CD (Compact Disc)-ROM, a DVD (Digital Versatile Disc)-ROM, and a BD (Blu-ray (registered trademark) Disc); a magnetic disk such as a flexible disk and a hard disk; a magneto-optical disc; a semiconductor memory; or the like. Further, the computer program 10a according to the present Embodiment 1 may be downloaded from an external computer (not illustrated) connected to a communication network (not illustrated) and then may be stored into the storage part 14.

The in-vehicle receiving part 12 is connected to the receiving antenna 4. Through the receiving antenna 4, the in-vehicle receiving part 12 receives the response signal transmitted from the portable device 2 by wireless. The in-vehicle receiving part 12 is a circuit removing a carrier component from the received response signal so as to extract the received signal and then outputting the extracted received signal to the control part 11. The Ultra High Frequency band (the UHF band) from 300 MHz to 3 GHz is employed as the carrier. However, employable frequency bands are not limited to this.

The in-vehicle transmitting part 13 is a circuit that modulates the signal outputted from the control part 11 into a radio signal by using a carrier and then transmits the radio signal through one transmitting antenna (3) selected by the control part 11 and the switching unit 13a to the portable device 2. The Low Frequency band (the LF band) from 30 kHz to 300 MHz is employed as the carrier. However, employable frequency bands are not limited to this.

Further, a request signal corresponding to the operating state of the vehicle door request switch (not illustrated) is inputted to the control part 11 of the in-vehicle device 1. On the basis of the inputted request signal, the control part 11 is allowed to recognize the operating state of the vehicle door request switch. For example, the vehicle door request switch is a switch used for locking or unlocking a vehicle door on the driver side or the passenger side and is provided in the door handle in the driver-side outside or the passenger-side outside. Here, in place of a push button, a contact sensor detecting the contact of the user's hand to the door handle may be provided. Further, the control part 11 may directly acquire a request signal corresponding to the operation of the vehicle door request switch or, alternatively, may acquire the request signal through an ECU such as a door ECU (Electronic Control Unit).

In accordance with the situations such as the operating state of the vehicle door request switch and whether the portable device is located in the inside of the vehicle cabin, the control part 11 outputs to a door ECU (not illustrated) a vehicle door control command of controlling the unlocking or locking of the vehicle door. In accordance with the vehicle door control command from the control part 11, the door ECU locks or unlocks the vehicle door. Further, in accordance with the situation, when required, the control part 11 outputs a warning instruction to a warning device (not illustrated). For example, when the vehicle door request switch is operated in a situation that the portable device 2 is located in the inside of the vehicle cabin, the control part 11 outputs a warning instruction to the warning device. In accordance with the warning instruction, the warning device issue a given warning to the user of the vehicle by using sound or light.

Further, an engine start signal corresponding to the operating state of an engine start switch (not illustrated) is inputted to the control part 11 of the in-vehicle device 1. On the basis of the inputted engine start signal, the control part 11 is allowed to recognize the operating state of the engine start switch. In accordance with the situations such as the operating state of the engine start switch and whether the portable device 2 is located in the inside of the vehicle cabin, the control part 11 outputs to an engine ECU (not illustrated) an engine control command of starting or stopping the engine. In accordance with the engine control command from the control part 11, the engine ECU starts or stops the engine.

Figure 3:
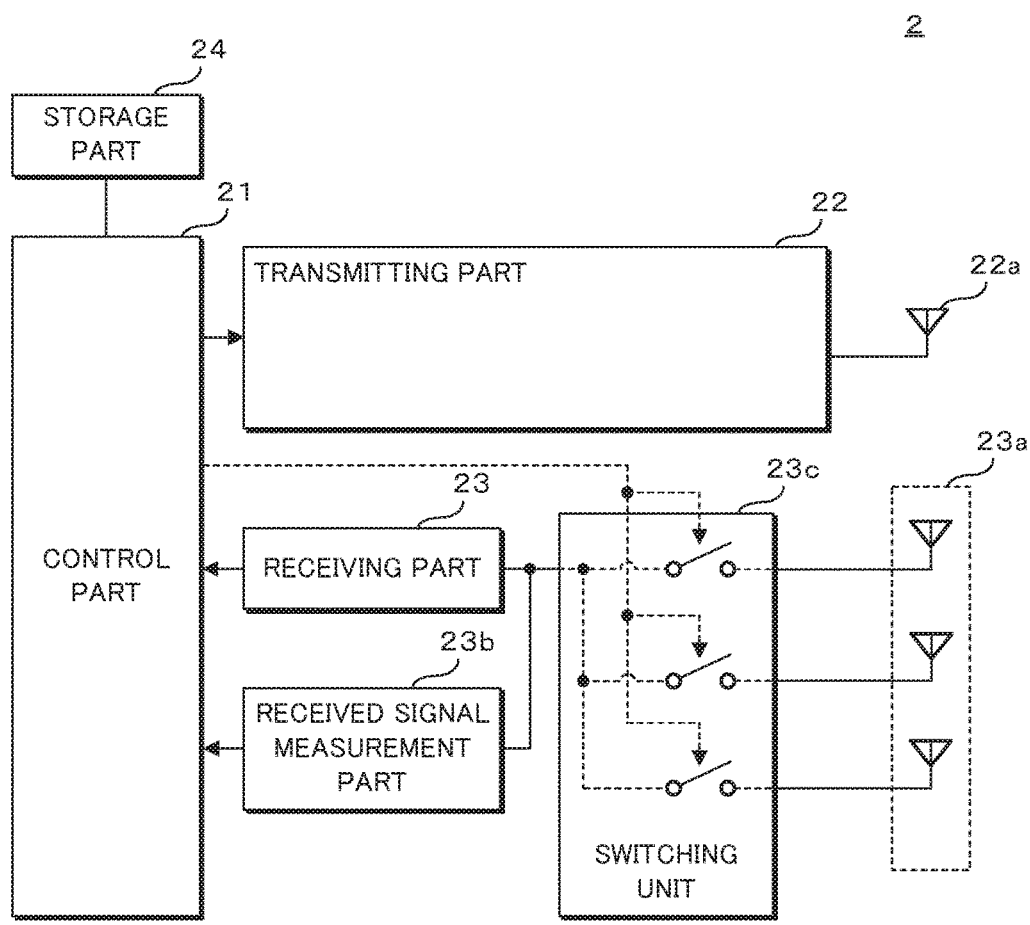
FIG. 3 is a block diagram illustrating an exemplary configuration of a portable device.

FIG. 3 is a block diagram illustrating an exemplary configuration of the portable device 2. The portable device 2 includes a control part 21 controlling the operation of each constituting part of the portable device 2. The control part 21 includes a receiving part 23, a signal strength measurement part 23b, a switching unit 23c, a transmitting part 22, and a storage part 24.

For example, the control part 21 is constructed from a microcomputer including one or a plurality of CPUs, multi-core CPUs, ROMs, RAMs, input/output interfaces, timers, and the like. The CPU of the control part 21 is connected through the input/output interface to the transmitting part 22 and the receiving part 23. The control part 21 executes a control program stored in the storage part 24 so as to control the operation of each constituting part and thereby executes various processing of transmitting information required for the vehicle cabin inside-or-outside determination of the portable device 2 to the in-vehicle device 1.

The storage part 24 is constructed from a non-volatile memory similar to the storage part 14. The storage part 24 stores the control program for operation that the control part 21 controls the operation of each constituting part of the portable device 2 so as to perform the vehicle cabin inside-or-outside determination of the portable device 2. In accordance with the control program, the control part 21 executes the processing of transmitting to the in-vehicle device 1 the response signal and the like containing the information required for the vehicle cabin inside-or-outside determination. Further, the storage part 24 stores a portable device identifier for identifying the portable device 2. Here, in FIG. 3, the control part 21 and the storage part 24 are illustrated as separate constituting parts from each other. Instead, the storage part 24 may be provided in the inside of the control part 21.

The receiving part 23 is connected through the switching unit 23c to a three-axis antenna 23a constructed such that three coils are arranged in orthogonal directions to each other. The receiving part 23 receives through the three-axis antenna 23a and the switching unit 23c the radio signal transmitted from the in-vehicle device 1. The three radio signals received by the three-axis antenna 23a are inputted into the switching unit 23c. In accordance with the control of the control part 21, the switching unit 23c selects one radio signal. The receiving part 23 is a circuit that removes a carrier component from the radio signal selected by the switching unit 23c so as to extract the received signal and then outputs the extracted received signal to the control part 21. The Low Frequency band (the LF band) from 30 kHz to 300 MHz is employed as the carrier. However, employable frequency bands are not limited to this.

Further, the portable device 2 includes the signal strength measurement part 23b that receives through the three-axis antenna 23a the radio signal transmitted from the in-vehicle device 1, then measures the received signal strength of the radio signal selected by the switching unit 23c, and then outputs to the control part 21 the measured received signal strength.

In accordance with the timing that a radio signal for signal strength measurement is transmitted from the in-vehicle device 1, the control part 21 selects each of the three radio signals from the three-axis antenna 23a and then measures the received signal strength of the selected radio signal by using the signal strength measurement part 23b. That is, in place of the received signal strength in the amplitude direction of the radio signal transmitted from the in-vehicle device 1, the control part 21 measures the components of the received signal strength in the three orthogonal directions of the three-axis antenna 23a. The control part 21 performs a vector calculation from the components of the measured received signal strength so as to calculate the received signal strength in the amplitude direction of the radio signal transmitted from the in-vehicle device 1. Thus, the control part 21 is allowed to acquire a fixed received signal strength regardless of the orientation or the attitude of the portable device 2 relative to the vehicle C. In the following description, unless otherwise mentioned in particular, the received signal strength calculated by the vector calculation is referred to as a received signal strength.

Here, an example has been described above that the control part 21 calculates the received signal strength. Instead, the received signal strength of each signal received through the three-axis antenna 23a may be transmitted from the portable device 2 to the in-vehicle device 1 and then the control part 11 of the in-vehicle device 1 may calculate the received signal strength.

The transmitting part 22 is a circuit that modulates by using a carrier a response signal inputted by the control part 21 and then transmits a radio signal through a transmitting antenna 22a. The Low Frequency band (the LF band) from 30 kHz to 300 MHz is employed as the carrier. However, employable frequency bands are not limited to this.

Next, statistical values stored in the storage part 14 of the in-vehicle device 1 are described below. The storage part 14 stores statistical values setting forth a plurality of domains different from each other but each containing a common vehicle cabin inner space. In the present Embodiment 1, the storage part 14 stores statistical values setting forth four domains consisting of a first domain, a second domain, a third domain, and a fourth domain.

Figure 4A:
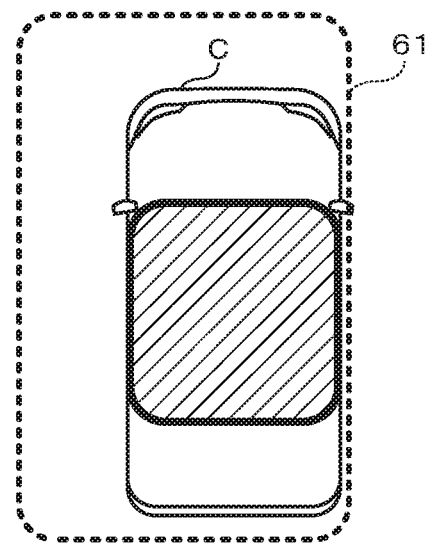
FIG. 4A is a plan view conceptually illustrating a first domain.
Figure 4B:
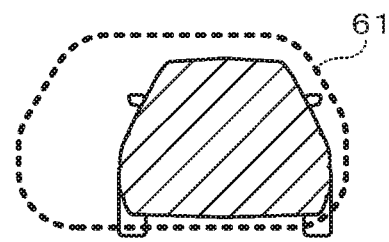
FIG. 4B is an elevation view conceptually illustrating a first domain.

FIG. 4A is a plan view conceptually illustrating the first domain 61. FIG. 4B is an elevation view conceptually illustrating the first domain 61. The first domain 61 is a three-dimensional space and then, as illustrated in FIGS. 4A and 4B, has a boundary following the right inner surface of the vehicle cabin and has a shape containing the common vehicle cabin inner space. Thus, the left side wall, the rear wall, and the windshield part that constitute the vehicle cabin are also contained in the first domain 61. In FIGS. 4A and 4B, the shaded portion indicates the common vehicle cabin inner space. For example, the common vehicle cabin inner space is a space where the user staying in the inside of the vehicle cabin is allowed to arrange the portable device 2.

The boundary of the first domain 61 does not completely agree with the inner surface of the vehicle cabin. Thus, even when the inside-or-outside determination of the portable device 2 in the first domain 61 is performed, the vehicle cabin inside-or-outside determination of the portable device 2 is not allowed to be accurately achieved. However, at least a part of the boundary of the first domain 61 approximately agrees with the right inner surface of the vehicle cabin. Thus, as long as the portable device 2 is located in the vicinity of the right side wall of the vehicle C, the vehicle cabin inside-or-outside determination of the portable device 2 is allowed to be accurately achieved.

Figure 5A:
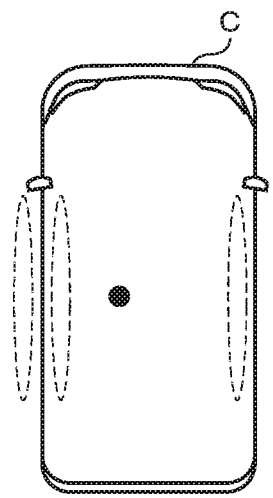
FIG. 5A is a conceptual diagram illustrating sampling locations concerning a first domain.
Figure 5B:
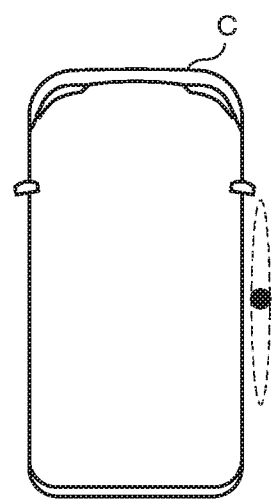
FIG. 5B is a conceptual diagram illustrating a sampling location concerning a first domain.

FIGS. 5A and 5B are conceptual diagrams illustrating sampling locations concerning the first domain 61. The statistical values setting forth the first domain 61 are calculated in the fabrication process of the vehicle-use communication system and then the storage part 14 stores the calculated statistical values. The statistical values are calculated on the basis of the sampled values of the received signal strengths measured by the portable device 2 having received each signal transmitted from the plurality of transmitting antennas (3). Here, the device measuring the sampled values of the received signal strengths may be not the portable device 2. That is, an arbitrary measuring equipment allowed to measure the strength of the signal corresponding to the received signal strength measured by the portable device 2 may be employed.

The sampled value of the received signal strength is acquired when the portable device 2 is arranged at a particular location in the inside and the outside of the vehicle C and then the received signal strength is measured. In the following description, the set of the received signal strengths measured at a plurality of locations is referred to as a sample group. As statistical values used for setting forth the first domain 61, the storage part 14 stores first statistical values based on a sample group characterizing the inner side of the first domain 61 and second statistical values based on a sample group characterizing the outside of the first domain 61.

FIG. 5A illustrates the arrangement of the portable device 2 to obtain the sampled values used for calculating the first statistical values. Specifically, the portable device 2 is arranged at a plurality of locations along the inner surface of the right side of the vehicle cabin and at a plurality of locations along the inner surface and outer surface of the left side of the vehicle cabin. Then, the received signal strength of the signal received by the portable device 2 is measured at each location. Then, the first statistical values are calculated on the basis of the sampled values of the measured received signal strengths. An ellipse of dashed line indicates a location where the portable device 2 is to be arranged.

Since four transmitting antennas (3) are employed in the present Embodiment 1, four received signal strengths are measured at one location by the portable device 2. Thus, the sample of the received signal strengths obtained at each location is of a vector quantity and hence the sample group is a group of samples each constructed from a vector. Each vector having four received signal strengths as components is referred to as a received signal strength vector.

Here, despite that the sample group is for characterizing the inner side of the first domain 61, as illustrated in FIG. 5A, the sample group contains also the sampled values of the received signal strengths measured in the outside of the vehicle cabin. This is for ensuring that the first domain 61 contains the entirety of the vehicle cabin inner space. In a case that the sample group does not contain the sampled values measured on the inner surface and outer surface of the left side of the vehicle cabin, the sample group is overemphasized by the sampled values of the received signal strengths measured in the right side face of the vehicle C. When the sample group is overemphasized by the sampled values measured in the right side face of the vehicle C, the left side part of the vehicle C is dropped from the region of the first domain 61 characterizes by the sample group. Thus, in the present Embodiment 1, the sampled values of the received signal strengths are acquired with arranging the portable device 2 at the locations illustrated in FIG. 5A.

For example, the first statistical values are the mean vector and the inverse variance-covariance matrix of the sample group characterizing the inner side of the first domain 61. The mean vector of the sample group is expressed by the following formulas (1) and (2). The filled circle illustrated in FIG. 5A indicates a conceptual position of the mean vector.

$$\vec{\mu} = \begin{bmatrix} \mu_1 \\ \mu_2 \\ \vdots \\ \mu_N \end{bmatrix} \quad (1)$$

$$\mu_n = E[X_n] \quad (2)$$

where $\vec{\mu}$: mean vector
$X_n$: sampled value of received signal strength of signal transmitted from n-th transmitting antenna
n: integer
N: number of transmitting antennas The variance-covariance matrix of the sample group characterizing the inner side of the first domain 61 is expressed by the following formulas (3) and (4). The inverse variance-covariance matrix is the inverse matrix of the variance-covariance matrix expressed by the following formula (3). The storage part 14 stores the inverse variance-covariance matrix.

$$\Sigma = \begin{bmatrix} \Sigma_{11} & \Sigma_{12} & \cdots & \Sigma_{1N} \\ \vdots & \vdots & \cdots & \vdots \\ \Sigma_{N1} & \Sigma_{N2} & \cdots & \Sigma_{NN} \end{bmatrix} \quad (3)$$

$$\Sigma_{ij} = E[(X_i - \mu_i)(X_j - \mu_j)] \quad (4)$$

where
i,j: integer

FIG. 5B illustrates the arrangement of the portable device 2 to obtain the sampled values used for calculating the second statistical values. Specifically, the portable device 2 is arranged at a plurality of locations along the outer surface of the right side of the vehicle cabin and then the received signal strength of the signal received by the portable device 2 is measured at each location. Then, the second statistical values are calculated on the basis of the sampled values of the measured received signal strengths. The second statistical values are the mean vector and the inverse variance-covariance matrix of the sample group characterizing the outer side of the first domain 61. Similarly to the first statistical values, the mean vector and the inverse variance-covariance matrix constituting the second statistical values are expressed by the formulas (1) to (4) given above. The filled circle illustrated in FIG. 5B indicates a conceptual position of the mean vector of the sample group.

Figure 6A:
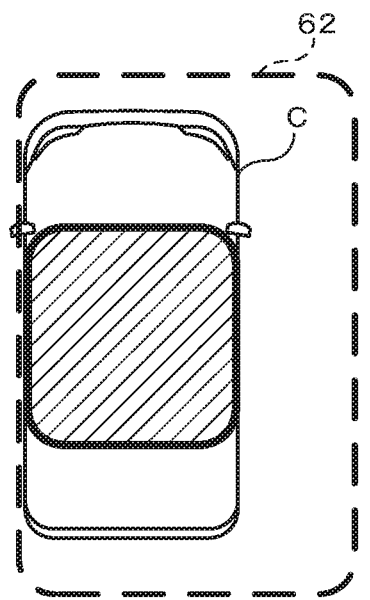
FIG. 6A is a plan view conceptually illustrating a second domain.
Figure 6B:
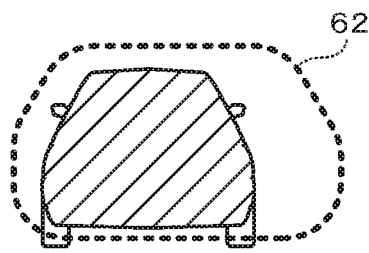
FIG. 6B is an elevation view conceptually illustrating a second domain.

FIG. 6A is a plan view conceptually illustrating a second domain 62. FIG. 6B is an elevation view conceptually illustrating the second domain 62. The second domain 62 is a three-dimensional space and then, as illustrated in FIGS. 6A and 6B, has a boundary following the left side face of the vehicle cabin and has a shape containing the common vehicle cabin inner space. Thus, the right side wall, the rear wall, and the windshield part that constitute the vehicle cabin are also contained in the second domain 62. In FIGS. 6A and 6B, the shaded portion indicates the common vehicle cabin inner space.

As statistical values used for setting forth the second domain 62, the storage part 14 stores first statistical values based on a sample group characterizing the inner side of the second domain 62 and second statistical values based on a sample group characterizing the outer side of the second domain 62.

Figure 7A:
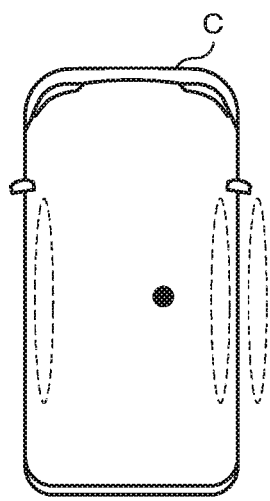
FIG. 7A is a conceptual diagram illustrating sampling locations concerning a second domain.
Figure 7B:
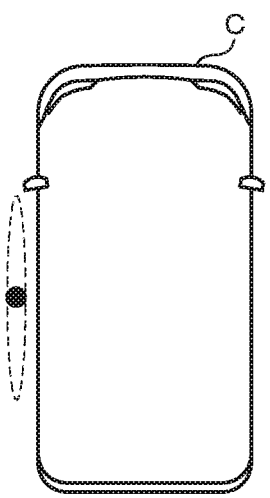
FIG. 7B is a conceptual diagram illustrating a sampling location concerning a second domain.

FIGS. 7A and 7B are conceptual diagrams illustrating sampling locations concerning the second domain 62. The sampled values of the received signal strengths used for calculating the first statistical values and the second statistical values that set forth the second domain 62 are obtained by a method that the portable device 2 is arranged at particular locations in the inside and the outside of the vehicle C illustrated in FIGS. 7A and 7B and then the received signal strengths are measured.

FIG. 7A illustrates the arrangement of the portable device 2 to obtain the sampled values used for calculating the first statistical values. Specifically, the portable device 2 is arranged at a plurality of locations along the inner surface of the left side of the vehicle cabin and at a plurality of locations along the inner surface and the outer surface of the right side of the vehicle cabin. Then, the received signal strength of the signal received by the portable device 2 is measured at each location. Then, the first statistical values are calculated on the basis of the sampled values of the measured received signal strengths. The first statistical values are the mean vector and the inverse variance-covariance matrix of the sample group characterizing the inner side of the second domain 62.

FIG. 7B illustrates the arrangement of the portable device 2 to obtain the sampled values used for calculating the second statistical values. Specifically, the portable device 2 is arranged at a plurality of locations along the outer surface of the left side of the vehicle cabin and then the received signal strength of the signal received by the portable device 2 is measured at each location. Then, the second statistical values are calculated on the basis of the sampled values of the measured received signal strengths. Similarly to the first statistical values, the second statistical values are the mean vector and the inverse variance-covariance matrix of the sample group characterizing the outer side of the second domain 62.

Figure 8A:
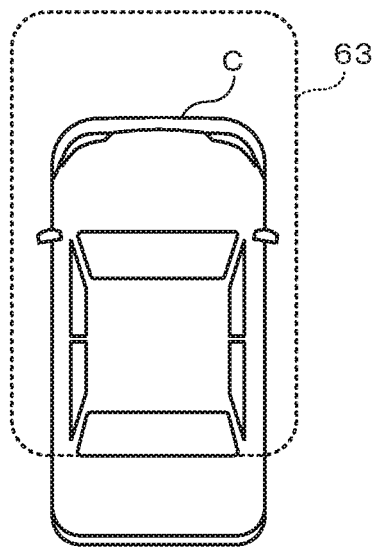
FIG. 8A is a conceptual diagram illustrating a third domain.
Figure 8B:
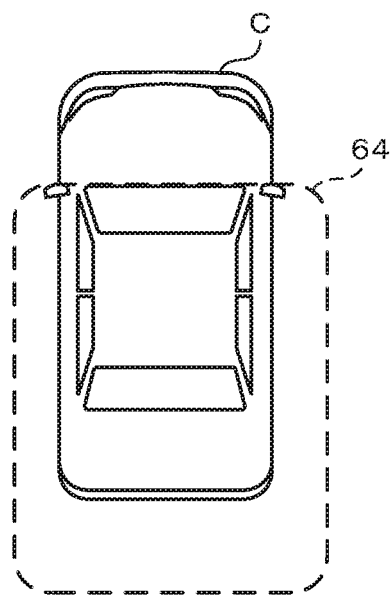
FIG. 8B is a conceptual diagram illustrating a fourth domain.

FIG. 8A is a conceptual diagram illustrating the third domain 63 and FIG. 8B is a conceptual diagram illustrating the fourth domain 64. Each of the third domain 63 and the fourth domain 64 is a three-dimensional space. As illustrated in FIG. 8A, the third domain 63 has a boundary following the inner surface of the rear side of the vehicle cabin and has a shape containing the entirety of the common vehicle cabin inner space. As illustrated in FIG. 8B, the fourth domain 64 has a boundary following the inner surface of the front side of the vehicle cabin and has a shape containing the entirety of the common vehicle cabin inner space.

Figure 9:
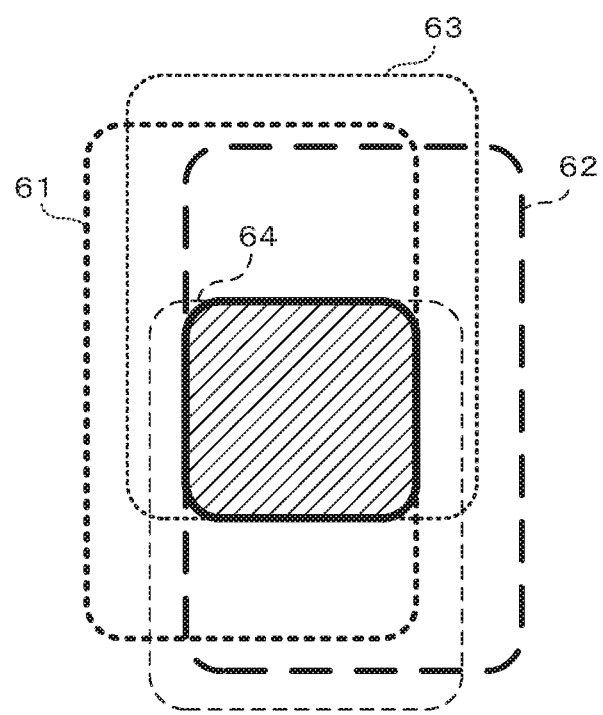
FIG. 9 is a conceptual diagram illustrating a domain corresponding to a vehicle cabin inner space.

FIG. 9 is a conceptual diagram illustrating a domain corresponding to the vehicle cabin inner space. The shaded region illustrated in FIG. 9 is a domain corresponding to the vehicle cabin inner space. Each of the first to the fourth domain 61, 62, 63, and 64 contains the common vehicle cabin inner space. Then, the boundary of each of the first to the fourth domain 61, 62, 63, and 64 follows the right side face, the left side face, the rear face, or the front face of the vehicle cabin. Thus, the space located within every one of the first to the fourth domain 61, 62, 63, and 64 approximately agrees with the vehicle cabin inner space.

Figure 10:
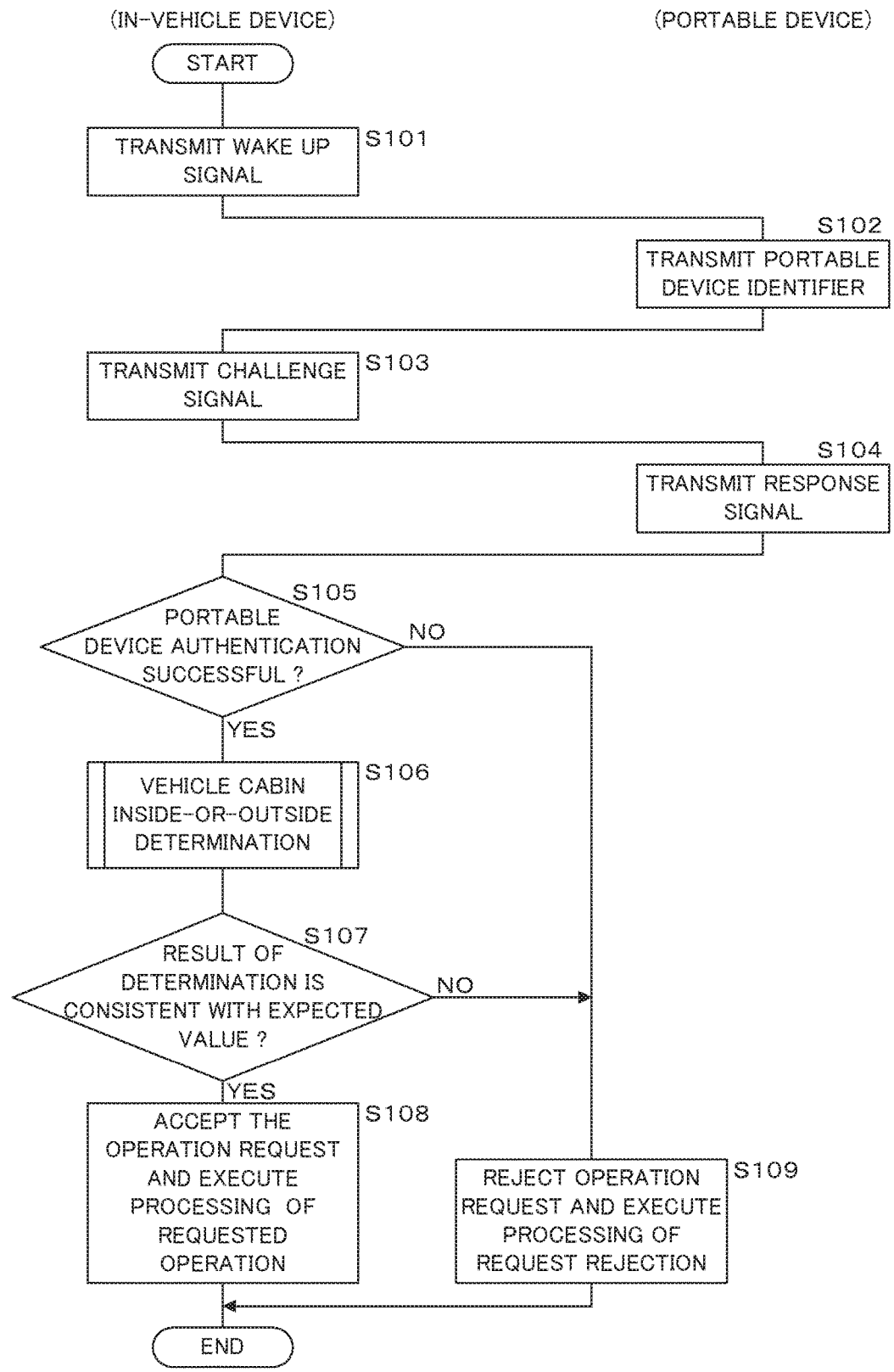
FIG. 10 is a flow chart illustrating a procedure of processing performed in response to an operation request.

FIG. 10 is a flow chart illustrating a procedure of processing performed in response to an operation request. When an operation request is inputted from the outside, the in-vehicle device 1 and the portable device 2 execute the following processing. Here, for example, the operation request indicates: a request of locking or unlocking of the vehicle door made on the basis of operation of the vehicle door request switch; and a request of engine start or stop made on the basis of the operation of the engine start switch.

For example, when a request signal in response to the operation of the vehicle door request switch is inputted to the in-vehicle device 1 or, alternatively, when an engine start signal in response to the operation of the engine start switch is inputted to the in-vehicle device 1, the in-vehicle device 1 starts the processing.

The control part 11 of the in-vehicle device 1 causes the in-vehicle transmitting part 13 to transmit a wake up signal from the transmitting antenna (3) (step S101).

The control part 21 of the portable device 2 having received the wake up signal in the receiving part 23 starts up from a sleep state into an active state and then transmits an own portable device identifier from the transmitting part 22 to the in-vehicle device 1 (step S102).

The control part 11 of the in-vehicle device 1 receives through the in-vehicle receiving part 12 the portable device identifier transmitted from the portable device 2. Then, by using the received portable device identifier, the control part 11 generates data for authentication and then causes the in-vehicle transmitting part 13 to transmit a challenge signal containing the data from the transmitting antenna (3) (step S103).

The control part 21 receives the challenge signal through the receiving part 23. Then, by using the data contained in the received challenge signal, the control part 21 checks the validity of the in-vehicle device 1. If the validity of the in-vehicle device 1 is concluded, the control part 21 generates data used for authentication of the portable device 2 by the in-vehicle device 1, and then transmits a response signal containing the data from the transmitting part 22 to the in-vehicle device 1 (step S104).

The control part 11 of the in-vehicle device 1 receives through the in-vehicle receiving part 12 the response signal transmitted from the portable device 2, and then performs the authentication of the portable device 2 by using the data contained in the received response signal (step S105). If it is determined that the authentication has been successful (step S105: YES), the control part 11 executes a subroutine of vehicle cabin inside-or-outside determination processing for the portable device 2 (step S106). That is, the control part 11 performs determination of whether the portable device 2 is located in the inside of the vehicle cabin or in the outside of the vehicle cabin. The result of the vehicle cabin inside-or-outside determination is expressed by a numeral value. For example, when the portable device 2 is located in the inside of the vehicle cabin, the numerical value of the vehicle cabin inside-or-outside determination result is premised to be 1. Further, when the portable device 2 is located in the outside of the vehicle cabin, the numerical value of the vehicle cabin inside-or-outside determination result is premised to be 0.

Then, the control part 11 determines whether the result of the vehicle cabin inside-or-outside determination is consistent with an expected value set forth in advance in accordance with the contents of the operation request (step S107). For example, the expected value corresponding to the operation of unlocking the vehicle door based on the operation of the vehicle door request switch is 0 and the expected value corresponding to the operation of engine start is 1.

If it is determined that the result of the vehicle cabin inside-or-outside determination is consistent with the expected value (step S107: YES), the control part 11 accepts the operation request and then executes the processing corresponding to the operation request (step S108). For example, in a case that the vehicle door request switch is operated, the control part 11 executes the processing of outputting to the door ECU a vehicle door control signal instructing the locking or unlocking of the vehicle door. In a case that the engine start switch is operated, the control part 11 executes the processing of outputting to the engine ECU an engine control command of starting or stopping the engine.

If it is determined that the result of the vehicle cabin inside-or-outside determination is not consistent with the expected value (step S107: NO) or, alternatively, if it is determined that the authentication of the portable device 2 has been failed (step S105: NO), the control part 11 rejects the operation request and executes the processing of request rejection (step S109), and then terminates the processing. For example, the processing of request rejection is such processing that when the engine start switch has been operated but the portable device 2 is not located in the inside of the vehicle cabin, a warning beep is generated. Here, the processing of request rejection is not indispensable.

Figure 11:
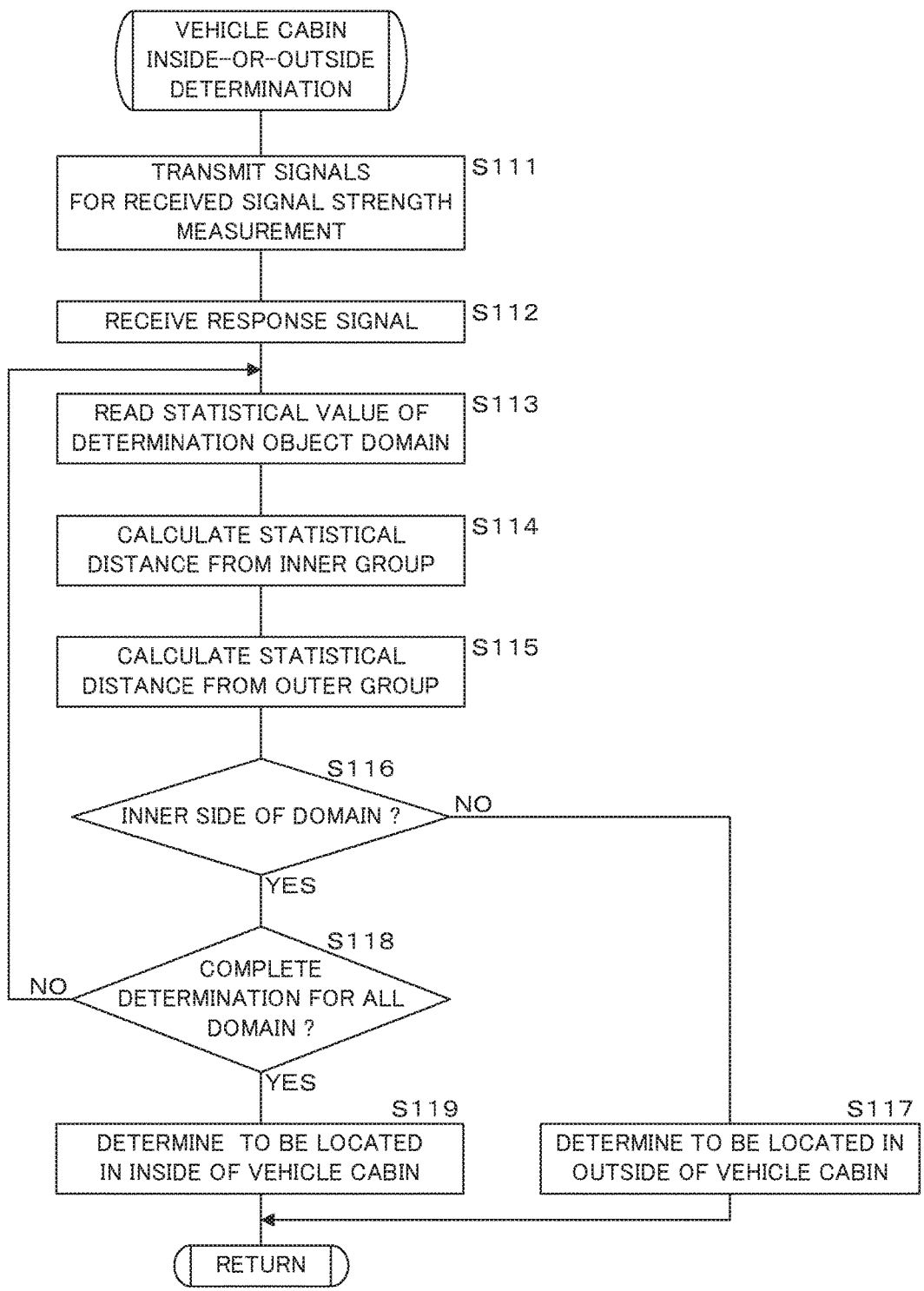
FIG. 11 is a flow chart illustrating a processing procedure of a vehicle cabin inside-or-outside determination subroutine in Embodiment 1.

FIG. 11 is a flow chart illustrating a processing procedure of the vehicle cabin inside-or-outside determination subroutine in Embodiment 1. The control part 11 of the in-vehicle device 1 causes the in-vehicle transmitting part 13 to successively transmit a signal for received signal strength measurement used for the vehicle cabin inside-or-outside determination from each of the plurality of transmitting antennas (3) (step S111).

The control part 21 of the portable device 2 receives through the receiving part 23 the signal transmitted from each transmitting antenna (3) and then acquires the received signal strength of each signal measured by the signal strength measurement part 23b. Then, the control part 21 transmits a response signal containing the measured received signal strength, through the transmitting part 22 to the in-vehicle device 1.

The control part 11 of the in-vehicle device 1 receives through the in-vehicle receiving part 12 the response signal transmitted from the portable device 2 (step S112). Then, at step S113 to step S118, on the basis of the received signal strengths contained in the response signals received by the in-vehicle receiving part 12, the control part 11 executes the processing of determining whether the portable device 2 is located within each of the first to the fourth domain 61, 62, 63, and 64. The processing of step S113 to step S118 is executed for each of the first to the fourth domain 61, 62, and 63, and 64. However, the processing performed on the first domain 61 is mainly described as a typical example.

The control part 11 reads from the storage part 14 the statistical values, i.e., the first statistical values and the second statistical values, of one domain among the first to the fourth domain 61, 62, 63, and 64 (step S113). For example, the control part 11 reads from the storage part 14 the first statistical values and the second statistical values of the first domain 61.

Then, on the basis of the received signal strengths contained in the response signals received at step S112 and on the basis of the first statistical values read at step S113, the control part 11 calculates a statistical distance between the received signal strengths and the sample group concerning the first statistical values (step S114). In a case that the first statistical values of the first domain 61 have been read at step S113, the control part 11 calculates a statistical distance between the received signal strengths contained in the response signals and the sample group characterizing the inner side of the first domain 61. For example, the statistical distance is the Mahalanobis distance. The Mahalanobis distance is expressed by the following formula (5).

$$D^2 = (\vec{\chi} - \vec{\mu})^T \cdot \Sigma^{-1} \cdot (\vec{\chi} - \vec{\mu}) \qquad (5)$$

where
D: Mahalanobis distance
$\vec{\chi}$: received signal strength vector
$\vec{\mu}$: mean vector
$\Sigma^{-1}$: inverse variance-covariance matrix $$\vec{\chi} = \begin{bmatrix} \chi_1 \\ \chi_2 \\ \vdots \\ \chi_N \end{bmatrix} \quad (6)$$

where
$\chi_n$: received signal strength of signal transmitted from n-th transmitting antenna Then, on the basis of the received signal strengths contained in the response signals received at step S112 and on the basis of the second statistical values read at step S113, the control part 11 calculates a statistical distance between the received signal strengths and the sample group concerning the second statistical values (step S115). In a case that the second statistical values of the first domain 61 have been read at step S113, the control part 11 calculates a statistical distance between the received signal strengths contained in the response signals and the sample group characterizing the outer side of the first domain 61. For example, the statistical distance is the Mahalanobis distance.

Then, the control part 11 compares the statistical distance calculated at step S114 with the statistical distance calculated at step S115 so as to determine whether the portable device 2 is located within the one domain (step S116). For example, if the statistical distance from the sample group characterizing the inner side of the first domain 61 is shorter than the statistical distance from the sample group characterizing the outer side of the first domain 61, the control part 11 determines that the portable device 2 is located within the first domain 61. For example, if the statistical distance from the sample group characterizing the outer side of the first domain 61 is shorter than the statistical distance from the sample group characterizing the inner side of the first domain 61, the control part 11 determines that the portable device 2 is located on the outer side of the first domain 61.

If it is determined that the portable device 2 is located on the outer side of the one domain (step S116: NO), the control part 11 determines that the portable device 2 is located in the outside of the vehicle cabin (step S117), and then terminates the processing of the subroutine.

If it is determined that the portable device 2 is located within the one domain (step S116: YES), the control part 11 determines whether the inside-or-outside determination of the portable device 2 has been completed for all domains (step S118). That is, it is determined whether the inside-or-outside determination of the portable device 2 has been completed in all of the first to the fourth domain 61, 62, 63, and 64. If it is determined that the inside-or-outside determination of the portable device 2 is not yet completed for any domain (step S118: NO), the control part 11 returns the processing to step S113 so as to execute the inside-or-outside determination processing for the portable device 2 for other domains on which the inside-or-outside determination is not yet performed.

If it is determined that the inside-or-outside determination of the portable device 2 has been completed for all domains (step S118: YES), the control part 11 determines that the portable device 2 is located in the inside of the vehicle cabin (step S119), and then terminates the processing of the subroutine.

Figure 12:
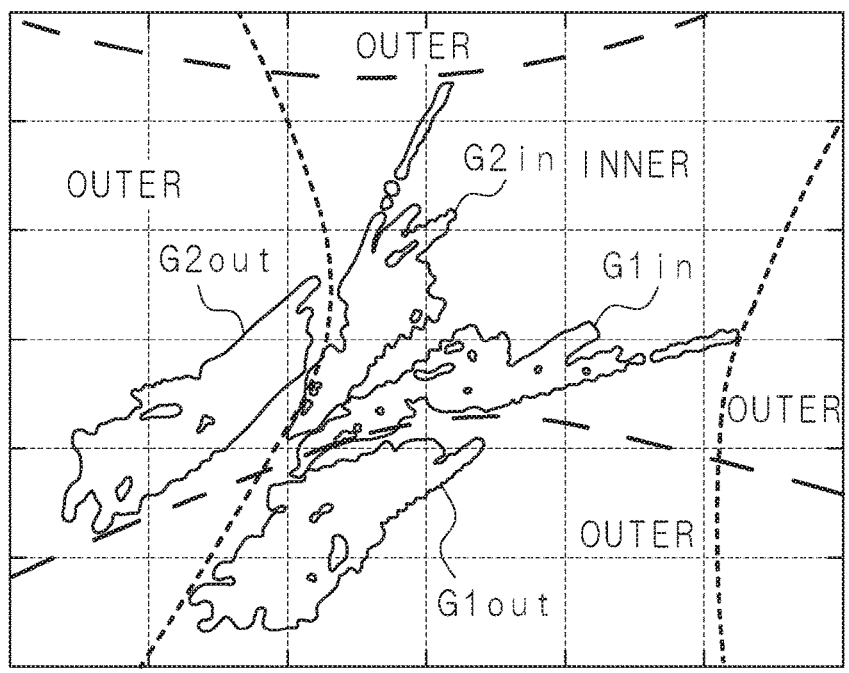
FIG. 12 is a graph illustrating a distribution of received signal strengths.

FIG. 12 is a graph illustrating the distribution of the received signal strengths. The horizontal axis indicates the received signal strength of the signal transmitted from the first transmitting antenna 31. The vertical axis indicates the received signal strength of the signal transmitted from the second transmitting antenna 32. For simplicity of description, FIG. 12 illustrates the distribution of the received signal strengths in two dimensions. In particular, FIG. 12 is a graph plotting the received signal strengths obtained by a method that the portable device 2 is arranged at a plurality of locations in the first domain 61 and the second domain 62 and then each signal transmitted from the first transmitting antenna 31 and the second transmitting antenna 32 is received and measured by the portable device 2. The lower part of the graph corresponds to the outside of the vehicle cabin on the driver side. The left part corresponds to the outside of the vehicle cabin on the passenger side. The center part and the upper right part correspond to the inside of the vehicle cabin.

Here, for simplicity of description by using the two-dimensional graph, the following description is given for a case that each sample acquired on the inner side and the outer side of the first domain 61 and the second domain 62 contains two received signal strengths, that is, the received signal strength from the first transmitting antenna 31 on the driver side and the received signal strength from the second transmitting antenna 32 on the passenger side. However, needless to say, the mode of the present invention is not limited to the processing employing such two received signal strengths.

The G1out indicates a region of the received signal strengths allowed to be measured by the portable device 2 arranged in the outside of the vehicle cabin on the driver side. The G1in indicates a region of the received signal strengths allowed to be measured by the portable device 2 arranged in the inside of the vehicle cabin on the driver side.

The G2out indicates a region of the received signal strengths allowed to be measured by the portable device 2 arranged in the outside of the vehicle cabin on the passenger side. The G2in indicates a region of the received signal strengths allowed to be measured by the portable device 2 arranged in the inside of the vehicle cabin on the passenger side.

[Description of Driver Side Domain]

The dashed lines convex upward and downward indicates a set of received signal strengths where the statistical distance from the sample group of the inner side of the first domain 61 and the statistical distance from the sample group of the outer side become equal to each other. Then, whether the portable device 2 is located within or without the first domain 61 is distinguished by this set. The region encompassed by the two dashed lines corresponds to the inner side of the first domain 61. As illustrated in FIG. 12, by virtue of the dashed lines, accurate distinction is achieved such that the region G1in of the received signal strengths measured in the inside of the vehicle cabin on the driver side is recognized as the inner side and the region G1out of the received signal strengths measured in the outside of the vehicle cabin on the driver side is recognized as the outer side. However, the inner side includes the G2in measured in the inside of the vehicle cabin on the passenger side and the G2out measured in the outside of the vehicle cabin on the passenger side. That is, the first domain 61 contains the common vehicle cabin inner space and distinguishes the inside and the outside from each other as illustrated in FIGS. 4A and 4B.

[Description of Passenger Side Domain]

The dotted lines convex rightward and leftward indicates a set of received signal strengths where the statistical distance from the sample group of the inner side of the second domain 62 and the statistical distance from the sample group of the outer side become equal to each other. Then, whether the portable device 2 is located within or without the second domain 62 is distinguished by this set. The region encompassed by the two dotted lines corresponds to the inner side of the second domain 62. As illustrated in FIG. 12, by virtue of the dotted lines, accurate distinction is achieved such that the region G2in of the received signal strengths measured in the inside of the vehicle cabin on the passenger side is recognized as the inner side and the region G2out of the received signal strengths measured in the outside of the vehicle cabin on the passenger side is recognized as the outer side. However, the inner side includes the G1in measured in the inside of the vehicle cabin on the driver side and the G1out measured in the outside of the vehicle cabin on the driver side. That is, the second domain 62 contains the common vehicle cabin inner space and distinguishes the inside and the outside from each other as illustrated in FIGS. 6A and 6B.

[First Domain and Second Domain]

In order that it may be determined at step 118 and step S119 that the portable device 2 is located within the common vehicle cabin inner space, it is required to be determined as being located on the inner side in the inside-or-outside determination in the domain 1 and the inside-or-outside determination in the domain 2. Thus, by virtue of the step 118 and step S119, the vehicle cabin inside-or-outside determination of whether the portable device 2 is located within or without the "common vehicle cabin inner space" is allowed to be realized accurately on the side face boundary on the driver side and on the side face boundary on the passenger side.

[Third Domain and Fourth Domain]

As described above, the vehicle cabin inside-or-outside determination of the portable device 2 is allowed to be accurately performed on the boundaries of the side face on the driver side and of the side face on the passenger side. However, when required, the inside-or-outside determination on any other boundary may be added in accordance with a similar technique. For example, a configuration may be employed that the third domain 63 and the fourth domain 64 that follow the vehicle rear boundary and the vehicle front boundary are added and then the inside-or-outside determination of the portable device 2 is performed on the first to the fourth domain 61, 62, 63, and 64. In this case, the vehicle cabin inside-or-outside determination of whether the portable device 2 is located within or without the "common vehicle cabin inner space" is allowed to be realized accurately on the side face boundary on the driver side, the side face boundary on the passenger side, the vehicle rear boundary, and the vehicle front boundary.

Next, the effects of the vehicle-use communication system according to the present Embodiment 1 are described below with reference to a comparison example.

Figure 13A:
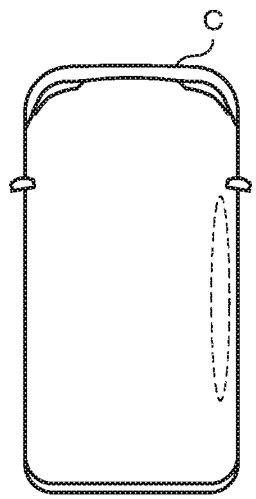
FIG. 13A is a conceptual diagram illustrating a sampling location concerning a comparison example of a first domain.
Figure 13B:
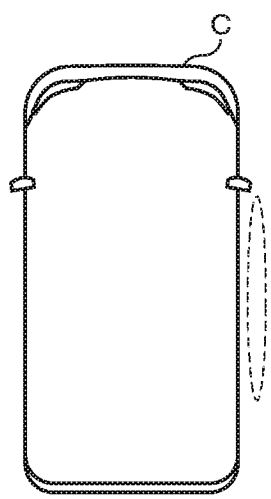
FIG. 13B is a conceptual diagram illustrating a sampling location concerning a comparison example of a first domain.

FIGS. 13A and 13B are conceptual diagrams illustrating sampling locations according to a comparison example of the first domain 61. The sampled values of the received signal strengths used for calculating the first statistical values and the second statistical values that set forth the domain of the comparison example of the first domain 61 are obtained by a method that the portable device 2 is arranged at particular locations in the inside and the outside of the vehicle C illustrated in FIGS. 13A and 13B and then the received signal strengths are measured. The comparison example of the first domain 61 is referred to as a first comparison example domain.

FIG. 13A illustrates the arrangement of the portable device 2 to obtain the sampled values used for calculating the first statistical values. Specifically, the portable device 2 is arranged at a plurality of locations along the inner surface of the right side of the vehicle cabin and then the received signal strength of the signal received by the portable device 2 is measured at each location. Then, the first statistical values are calculated on the basis of the sampled values of the measured received signal strengths.

FIG. 13B illustrates the arrangement of the portable device 2 to obtain the sampled values used for calculating the second statistical values. Specifically, the portable device 2 is arranged at a plurality of locations along the outer surface of the right side of the vehicle cabin and then the received signal strength of the signal received by the portable device 2 is measured at each location. Then, the second statistical values are calculated on the basis of the sampled values of the measured received signal strengths.

Figure 14A:
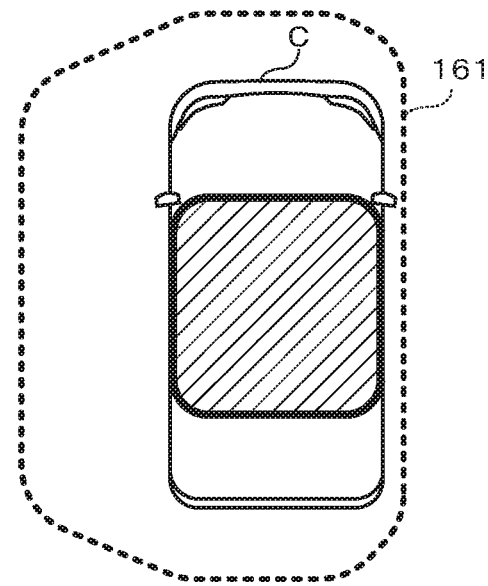
FIG. 14A is a plan view conceptually illustrating a first comparison example domain.
Figure 14B:
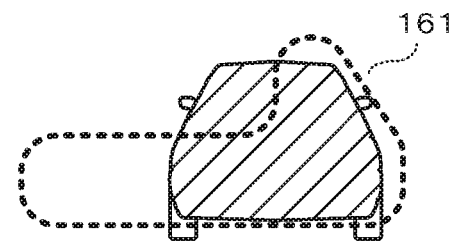
FIG. 14B is an elevation view conceptually illustrating a first comparison example domain.

FIG. 14A is a plan view conceptually illustrating the first comparison example domain 161. FIG. 14B is an elevation view conceptually illustrating the first comparison example domain 161. In FIGS. 14A and 14B, the shaded portion indicates the common vehicle cabin inner space in the present Embodiment 1. The first comparison example domain 161 is a three-dimensional space and then, as illustrated in FIGS. 14A and 14B, has a boundary following the right side face of the vehicle cabin but has a shape not containing the entirety of the vehicle cabin inner space. That is, as illustrated in FIG. 14B, the first comparison example domain 161 determined as the inside of the vehicle cabin has a shape not containing the common vehicle cabin inner space.

Figure 15A:
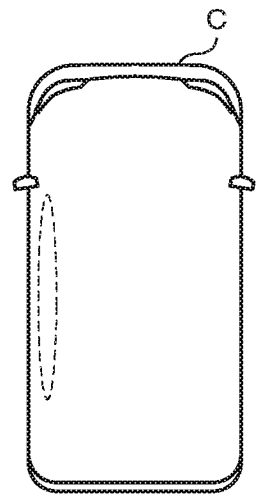
FIG. 15A is a conceptual diagram illustrating a sampling location concerning a comparison example of a second domain.
Figure 15B:
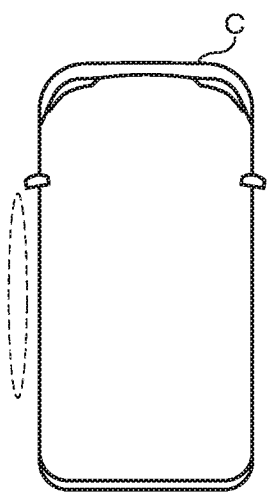
FIG. 15B is a conceptual diagram illustrating a sampling location concerning a comparison example of a second domain.

FIGS. 15A and 15B are conceptual diagrams illustrating sampling locations according to a comparison example of the second domain 62. The sampled values of the received signal strengths used for calculating the first statistical values and the second statistical values that set forth the domain of the comparison example of the second domain 62 are obtained by a method that the portable device 2 is arranged at particular locations in the inside and the outside of the vehicle C illustrated in FIGS. 15A and 15B and then the received signal strengths are measured. The comparison example of the second domain 62 is referred to as a second comparison example domain.

FIG. 15A illustrates the arrangement of the portable device 2 to obtain the sampled values used for calculating the first statistical values. Specifically, the portable device 2 is arranged at a plurality of locations along the inner surface of the left side of the vehicle cabin and then the received signal strength of the signal received by the portable device 2 is measured at each location. Then, the first statistical values are calculated on the basis of the sampled values of the measured received signal strengths.

FIG. 15B illustrates the arrangement of the portable device 2 to obtain the sampled values used for calculating the second statistical values. Specifically, the portable device 2 is arranged at a plurality of locations along the outer surface of the left side of the vehicle cabin and then the received signal strength of the signal received by the portable device 2 is measured at each location. Then, the second statistical values are calculated on the basis of the sampled values of the measured received signal strengths.

Figure 16A:
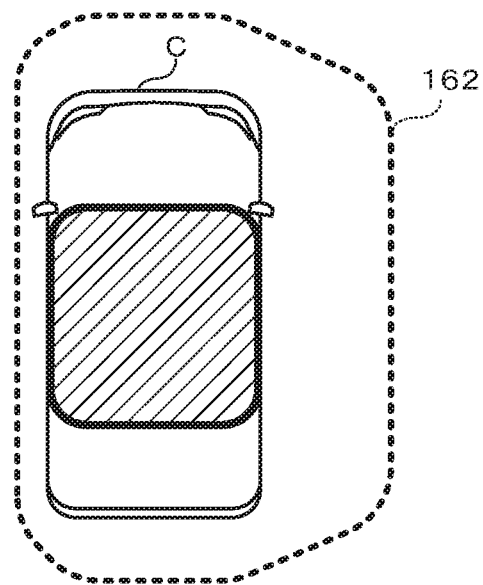
FIG. 16A is a plan view conceptually illustrating a second comparison example domain.
Figure 16B:
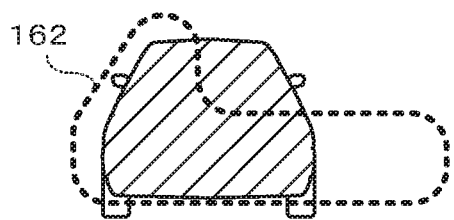
FIG. 16B is an elevation view conceptually illustrating a second comparison example domain.

FIG. 16A is a plan view conceptually illustrating the second comparison example domain 162. FIG. 16B is an elevation view conceptually illustrating the second comparison example domain 162. In FIGS. 16A and 16B, the shaded portion indicates the common vehicle cabin inner space in the present Embodiment 1. The second comparison example domain 162 is a three-dimensional space and then, as illustrated in FIGS. 16A and 16B, has a boundary following the left side face of the vehicle cabin but has a shape not containing the entirety of the vehicle cabin inner space. That is, as illustrated in FIG. 16B, the second comparison example domain 162 determined as the inside of the vehicle cabin has a shape not containing the common vehicle cabin inner space.

Figure 17A:
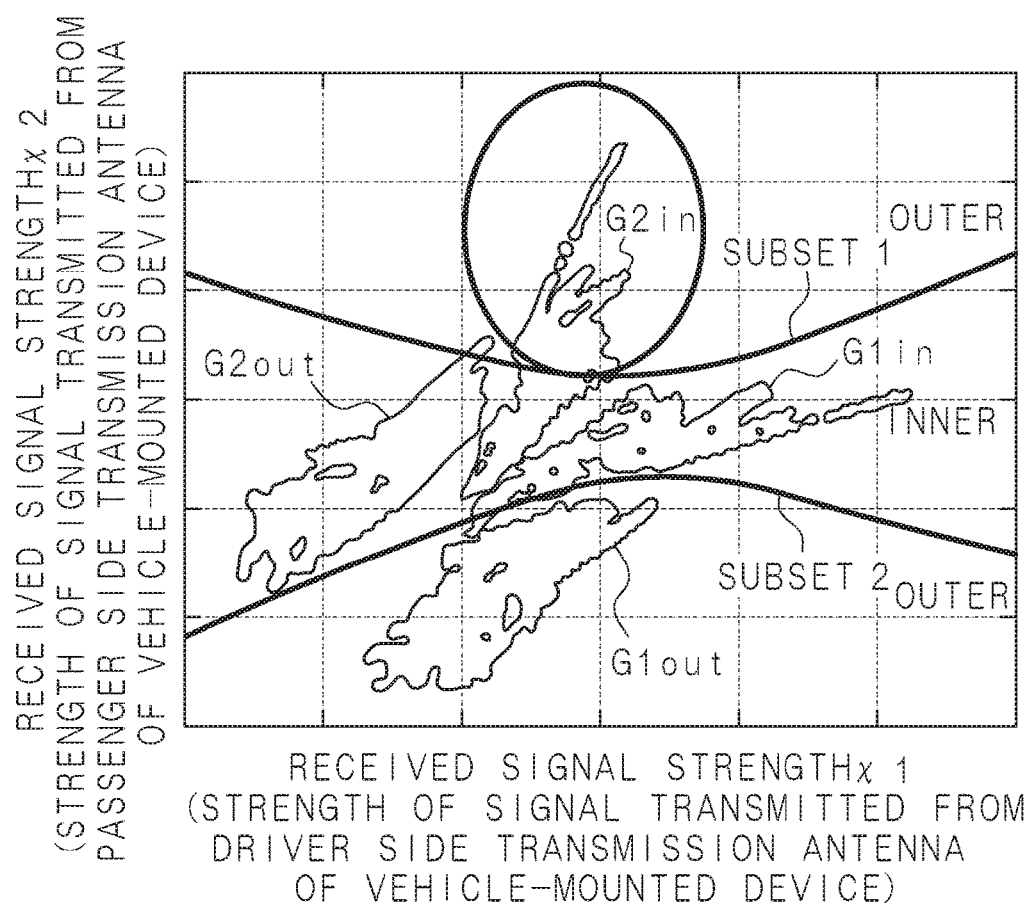
FIG. 17A is a graph illustrating a distribution of received signal strengths according to a comparison example.
Figure 17B:
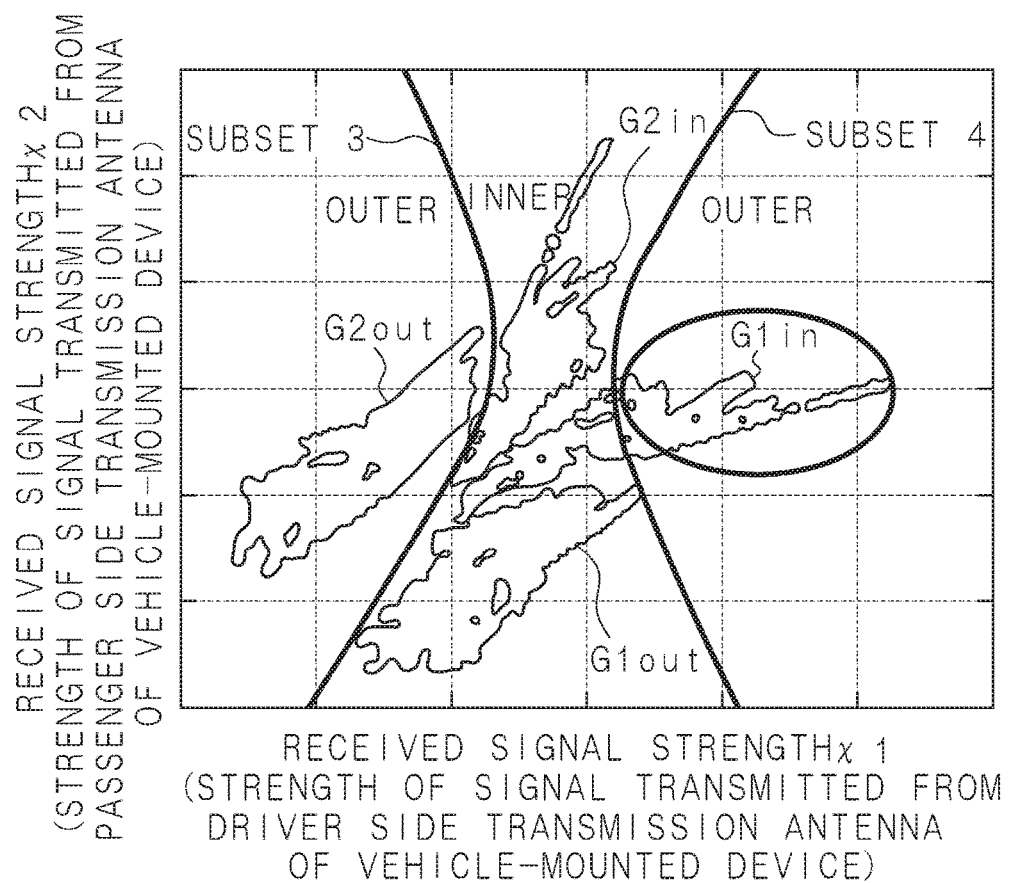
FIG. 17B is a graph illustrating a distribution of received signal strengths according to a comparison example.

FIGS. 17A and 17B are graphs illustrating the distribution of the received signal strengths according to the comparison example. The graphs of FIGS. 17A and 17B are similar to the graph of FIG. 12. Further, the regions G1out, G1in, G2out, and G2in are also similar to those described in FIG. 12. The subsets 1 to 4 illustrated in FIGS. 17A and 17B are described in Embodiment 2.

Each curve illustrated in FIG. 17A indicates a curve obtained by joining the received signal strengths where the statistical distance from the sample group of the inner side of the first comparison example domain 161 and the statistical distance from the sample group of the outer side become equal to each other. The region encompassed by the two curves corresponds to the inner side of the first comparison example domain 161. However, a part of the region G2in of the received signal strengths measured in the inside of the vehicle cabin on the passenger side extends beyond the region encompassed by the curves illustrated in FIG. 17A. The region indicated by an ellipse is the part of the region G2in extending beyond. Thus, accurate vehicle cabin inside-or-outside determination is not achieved by employing the first comparison example domain 161.

Each curve illustrated in FIG. 17B indicates a curve obtained by joining the received signal strengths where the statistical distance from the sample group of the inner side of the second comparison example domain 162 and the statistical distance from the sample group of the outer side become equal to each other. The region encompassed by the two curves corresponds to the inner side of the second comparison example domain 162. However, a part of the region G1in of the received signal strengths measured in the inside of the vehicle cabin on the driver side extends beyond the region encompassed by the curves illustrated in FIG. 17B. The region indicated by an ellipse is the part of the region G1in extending beyond. Thus, accurate vehicle cabin inside-or-outside determination is not achieved by employing the second comparison example domain 162.

Further, tentatively, even when the inside-or-outside determination is performed by using both of the first comparison example domain 161 and the second comparison example domain 162, the regions G1in and G2in of the received signal strengths measured in the inside of the vehicle cabin are not allowed to be distinguished from the received signal strengths G1out and G2out measured in the outside of the vehicle cabin.

In contrast to the comparison example given above, according to the present Embodiment 1, when the inside-or-outside determination of the portable device 2 is performed in each of the first domain 61 and the second domain 62 illustrated in FIG. 12 so that whether the portable device 2 is located within every domain is determined, the vehicle cabin inside-or-outside determination of the portable device 2 is allowed to be accurately achieved.

As described above, according to the vehicle-use communication system and the in-vehicle device 1 of the present Embodiment 1, when the inside-or-outside determination of the portable device 2 is performed in the first to the fourth domain 61, 62, 63, and 64, whether the portable device 2 is located within or without the vehicle cabin inner space is allowed to be accurately determined.

Further, according to the present Embodiment 1, each of the first to the fourth domain 61, 62, 63, and 64 has a boundary that follows a part of the inner surface of the vehicle cabin. Thus, when the inside-or-outside determination of the portable device 2 is performed in the first to the fourth domain 61, 62, 63, and 64, the vehicle cabin inside-or-outside determination in the part of the vehicle cabin is allowed to be accurately achieved.

Here, the present Embodiment 1 has been described for an example that the vehicle cabin inside-or-outside determination is performed by using the first to the fourth domain 61, 62, 63, and 64. However, employable configurations are not limited to the present embodiment. That is, the vehicle cabin inside-or-outside determination of the portable device 2 may be performed by using two domains consisting of the first domain 61 and the second domain 62. Further, the vehicle cabin inside-or-outside determination of the portable device 2 may be performed by using three domains consisting of the first to the third domain 61, 62, and 63. Further, the vehicle cabin inside-or-outside determination of the portable device 2 may be performed by using two or three domains arbitrarily selected from the first to the fourth domain 61, 62, 63, and 64 or, alternatively, by using five or more domains not illustrated.

Further, when the first domain 61 having a boundary that follows the right inner surface of the vehicle cabin and the second domain 62 having a boundary that follows the left inner surface are employed, the vehicle cabin inside-or-outside determination of the portable device 2 is allowed to be accurately performed in the right side face and the left side face of the vehicle cabin.

Furthermore, when the third domain 63 having a boundary that follows the inner surface on the rear side of the vehicle cabin is employed, the vehicle cabin inside-or-outside determination of the portable device 2 in the rear face of the vehicle cabin is allowed to be accurately performed.

Furthermore, when the fourth domain 64 having a boundary that follows the inner surface on the front side of the vehicle cabin is employed, the vehicle cabin inside-or-outside determination of the portable device 2 in the front face of the vehicle cabin is allowed to be accurately performed.

Further, the in-vehicle device 1 performs the vehicle cabin inside-or-outside determination of the portable device 2 by using the first statistical values and the second statistical values individually characterizing the inner side and the outer side of the first domain 61 and the second domain 62. As illustrated in FIGS. 5A and 5B and FIGS. 7A and 7B, the first statistical values and the second statistical values are calculated on the basis of the sample groups of the received signal strengths measured at a plurality of locations along the inner surface and the outer surface of the right side and left side of the vehicle C. When the sample groups described above are utilized as the sample groups for calculating the first statistical values and the second statistical values, the number of processes required for generation of the statistical values used for the inside-or-outside determination of the portable device 2 in the first domain 61 and the second domain 62 is effectively suppressed in comparison with a case that a huge sample group generated at random is employed.

Here, the present Embodiment 1 has been described for an example that the received signal strengths of the sample groups used for calculating the first statistical values and the second statistical values individually characterizing the inner side and the outer side of the first domain 61 and the second domain 62 are measures at the locations illustrated in FIGS. 5A and 5B and FIGS. 7A and 7B. However, these measurement locations are exemplary. For example, as for the sample group used for calculating the first statistical values concerning the first domain 61, it is sufficient that the received signal strengths are measured at least at a plurality of locations along the inner surface of the right side of the vehicle cabin and at a plurality of locations along the vehicle outer surface so that the first domain 61 contains the common vehicle cabin inner space. Further, a similar situation holds also for the second domain 62, the third domain 63, and the fourth domain 64.

Even in a case that the first statistical values and the second statistical values obtained by the method described above are employed, similar effects to those of the vehicle-use communication system described above are obtained.

Further, the in-vehicle device 1 may calculate the statistical distance from each of the sample groups characterizing the inner side and the outer side of the first to the fourth domain 61, 62, 63, and 6, on the basis of the first statistical values and the second statistical values and then may compare the calculated statistical distances with each other so as to perform the vehicle cabin inside-or-outside determination of the portable device 2. Specifically, the vehicle cabin inside-or-outside determination of the portable device 2 is allowed to be accurately performed by employing simple arithmetic operation such as the calculation of the Mahalanobis distance and the comparison of the Mahalanobis distances.

(Modification 1)

The present Embodiment 1 has been described for an example that the in-vehicle device 1 performs the vehicle cabin inside-or-outside determination of the portable device 2. Instead, a configuration may be employed that the portable device 2 itself performs the vehicle cabin inside-or-outside determination. The configuration of the vehicle-use communication system according to Modification 1 is similar to the configuration of Embodiment 1 and hence the in-vehicle device 1 and the portable device 2 are provided. In the portable device 2 of Modification 1, the storage part 24 stores the first statistical values and the second statistical values that set forth the first to the fourth domain 61, 62, 63, and 64; and a computer program of the present patent disclosure.

In the vehicle-use communication system of Modification 1, the processing of step S111 to step S119 described in FIG. 11 is executed by the control part 11 of the portable device 2 and then the vehicle cabin inside-or-outside determination result is transmitted to the in-vehicle device 1. A detailed processing procedure is as follows.

The in-vehicle device 1 successively transmits signals from the plurality of transmitting antennas (3). The control part 21 of the portable device 2 receives through the receiving part 23 the signal transmitted from each transmitting antenna (3) and then acquires the received signal strength of each signal measured by the signal strength measurement part 23b. Then, the control part 21 reads from the storage part 24 the first statistical values and the second statistical values of one domain among the first to the fourth domain 61, 62, 63, and 64.

Then, the control part 21 calculates a statistical distance between the measured received signal strengths and the sample group concerning the first statistical values. Further, the control part 21 calculates a statistical distance between the measured received signal strengths and the sample group concerning the second statistical values. Then, the control part 21 compares the calculated statistical distances with each other so as to determine whether the portable device 2 is located within the one domain.

Then, the control part 21 determines whether the inside-or-outside determination of the portable device 2 has been completed for all domains. If it is determined that the inside-or-outside determination of the portable device 2 is not yet completed for any domain, the control part 21 executes the inside-or-outside determination processing for the portable device 2 for other domains on which the inside-or-outside determination is not yet performed. If it is determined that the portable device 2 is located within every domain, the control part 21 determines that the portable device 2 is in the inside of the vehicle cabin. Further, if it is determined that the portable device 2 is located on the outer side of any one of the plurality of domains, the control part 21 determines that the portable device 2 is located in the outside of the vehicle cabin. Then, the control part 21 of the portable device 2 transmits a response signal containing the vehicle cabin inside-or-outside determination result of the portable device 2, through the transmitting part 22 to the in-vehicle device 1.

The in-vehicle device 1 receives the response signal transmitted from the portable device 2 and then, in accordance with the vehicle cabin inside-or-outside determination result contained in the received response signal, executes given processing. For example, the in-vehicle device 1 executes the processing of locking or unlocking of the vehicle door.

According to Modification 1, similarly to Embodiment 1, when the inside-or-outside determination of the portable device 2 is performed in the first to the fourth domain 61, 62, 63, and 64, whether the portable device 2 is located within or without the vehicle cabin inner space is allowed to be accurately determined. The other effects are also similar to those of Embodiment 1.

Here, the present Embodiment 1 and Modification 1 have been described mainly for an example of the vehicle cabin inside-or-outside determination of the portable device 2 in a case that a driver seat request switch 51 is operated. However, the present invention is applicable to various processing that requires the vehicle cabin inside-or-outside determination of the portable device 2. For example, the present invention is applicable to various processing such as checking of whether the portable device 2 is located in the inside of the vehicle cabin at the time of engine start, checking of whether the portable device 2 is located in the inside of the vehicle cabin during the engine operation, and checking of the position of the portable device 2 for avoiding a situation that the portable device 2 is locked in the vehicle cabin.

Further, the description given above has been for an example that the inside-or-outside determination in the first to the fourth domain 61, 62, 63, and 64 is performed by employing the Mahalanobis distance. However, the Mahalanobis distance is merely an example of the statistical distance. That is, any other arbitrary statistical values such as the statistical distance and the similarity may be employed as long as the degree of approximation between the measured received signal strengths and a particular sample group is allowed to be determined.

Further, the description given above has been for an example that the vehicle cabin inside-or-outside determination is achieved by the inside-or-outside determination in the first to the fourth domain 61, 62, 63, and 64. However, the first to the fourth domain 61, 62, 63, and 64 are exemplary. That is, as long as a configuration is employed that the inside-or-outside determination is performed by using domains each having a boundary that follows a part of the inner surface of the vehicle cabin inner space, arbitrary modification may be made to the vehicle-use communication system. For example, the vehicle cabin inside-or-outside determination of the portable device 2 may be performed by employing any two or three of the first to the fourth domain 61, 62, 63, and 64. Further, the vehicle cabin inside-or-outside determination of the portable device 2 may be performed by employing other two or more domains each having a shape different from those of the present Embodiment 2.

Furthermore, the vehicle-use communication system of the present Embodiment 1 has been described for an example that the storage part 14 stores the mean vector and the inverse variance-covariance matrix as the statistical values characterizing the inner side and the outer side of the first to the fourth domain 61, 62, 63, and 64. However, as long as the information allows the inside-or-outside determination in each domain, employable contents and storing methods thereof are not limited to particular ones. For example, the storage part 14 may store the mean vector and the variance-covariance matrix or, alternatively, may store the sample group itself. Further, the information such as the statistical values may be in a form different from that of the computer program 10*a* or, alternatively, may be information contained in the computer program 10*a*.

Furthermore, the locations of sampling the sample groups illustrated in FIGS. 5A and 5B and FIGS. 7A and 7B are exemplary. That is, the statistical values of each domain may be calculated by using a sample group of the received signal strengths measured at any other location as long as a domain is allowed to be set forth such as to have a boundary that follows a part of the inner surface of the vehicle cabin inner space and contain the entirety of the vehicle cabin inner space.

Embodiment 2

In a vehicle-use communication system according to the present Embodiment 2, the inside-or-outside determination in the first to the fourth domain 61, 62, 63, and 64 is performed by using a discriminant in place of the statistical values. In the vehicle-use communication system and the computer program according to Embodiment 2, the contents of the information stored in the storage part 14 of the in-vehicle device 1 and the processing procedure of the control part 11 are different from those of Embodiment 1. Thus, the following description is given mainly for these differences. The other configurations and operation effects are similar to those of Embodiment 1. Thus, corresponding parts are designated by like numerals and then detailed description is not given.

The storage part 14 of the in-vehicle device 1 stores a discriminant for discriminating whether the portable device 2 is located within or without the first domain 61 on the basis of the received signal strengths of the signals transmitted from the plurality of transmitting antennas (3). Similarly to Embodiment 1, the received signal strengths are measured by the signal strength measurement part 23*b* of the portable device 2. The first domain 61 is one domain on which the inside-or-outside determination of the portable device 2 is to be performed by the control part 11, and contains a "common vehicle cabin inner space" on which determination of whether the portable device 2 is located on the inner side or the outer side is to be performed.

In other words, the storage part 14 stores a discriminant for distinguishing the received signal strengths measured in the outside of the vehicle cabin on the driver side from the received signal strengths measured in the other locations. For example, the discriminant is an approximation formula of a curve that joins together the received signal strengths where the Mahalanobis distance between the sample group characterizing the inner side of the first domain 61 and the sample group characterizing the outer side of the first domain 61 become equal to each other.

The outlines of the generation method for the discriminant are as follows. First, the whole set of the points where the statistical distance from the sample group of the inner side of the right side face of the vehicle C and the statistical distance from the sample group of the outer side of the right side face of the vehicle C become equal to each other is identified. Then, a subset allowed to contain the "common vehicle cabin inner space" on which determination of whether the portable device 2 is located in the inside of the vehicle cabin or in the outside of the vehicle cabin is to be performed is extracted from the whole set. Then, an approximated curve of the extracted subset is acquired by polynomial approximation employing the least square method. Details are as follows.

In generation of the polynomial for discriminating whether the portable device 2 is located within or without the first domain 61, first, by using the sample group characterizing the inner side of the first domain 61 and the sample group characterizing the outer side of the first domain 61, the whole set of the points where the statistical distances from these sample groups become equal to each other is acquired. At that time, in order that the whole set may be plotted on a two-dimensional plane, each sample acquired on the inner side and the outer side of the first domain 61 is premised to be of a two-dimensional sample containing two received signal strengths. The whole set contains a subset 1 and a subset 2 of the points located on the two curves illustrated in FIG. 17A.

The domain distinguished by the whole set consisting of the subset 1 and the subset 2 becomes the domain illustrated in FIGS. 14A and 14B by virtue of the set of the points where the statistical distances become equal to each other as illustrated in FIG. 17A. As illustrated in FIGS. 14A and 14B, the domain surrounded by the dotted line within the domain is determined as the inside. Further, the outer side of the domain surrounded by the dotted line is determined as the outside. In FIGS. 14A and 14B, the shaded portion indicates the common vehicle cabin inner space. As remarkably seen in FIG. 14B, a part of the common vehicle cabin inner space is not contained in the domain determined as the inside. This is caused by the inside-or-outside distinction of the subset 1 illustrated in FIGS. 17A and 17B.

In order that the first domain 61 may contain the "common vehicle cabin inner space" on which the vehicle cabin inside-or-outside determination of the portable device 2 is to be performed, the subset 2 alone is extracted from the subset 1 and the subset 2 which are the set of the points illustrated in FIG. 17A where the statistical distances are equal to each other. The domain distinguished by the subset 2 becomes as illustrated in FIGS. 4A and 4B and hence the domain finally becomes the first domain 61 containing the "common vehicle cabin inner space" on which determination of whether the portable device 2 is located in the inside or the outside is to be performed.

A polynomial for the subset 2 extracted from FIG. 17A is acquired by the least square method and then employed as the polynomial for determining the inside or the outside of the first domain 61. The discriminant used for the inside-or-outside determination of the portable device 2 in the first domain 61 is expressed by the following formula (7).

$$Y = A_n \chi_1^n + A_{n-1} \chi_1^{n-1} + \ldots + A_1 \chi_1 + B \quad (7)$$

where
$A_n, A_{n-1}, \ldots A_1, B$: constants setting forth the function of individual components of received signal strength vector where Mahalanobis distance from sample group of inner side of first domain becomes equal to Mahalanobis distance from sample group of outer side of first domain Further, the storage part 14 stores a discriminant for discriminating whether the portable device 2 is located within or without the second domain 62 on the basis of the received signal strengths of the signals transmitted from the plurality of transmitting antennas (3). The second domain 62 is one domain on which the inside-or-outside determination of the portable device 2 is to be performed by the control part 11, and contains a "common vehicle cabin inner space" on which determination of whether the portable device 2 is located in the vehicle cabin inside or the vehicle cabin outside is to be performed.

The generation method for the discriminant of the second domain 62 is similar to the generation method for the discriminant concerning the first domain 61.

The outlines of the generation method for the discriminant are as follows. First, the whole set of the points where the statistical distance from the sample group of the inner side of the left side face of the vehicle C and the statistical distance from the sample group of the outer side of the left side face of the vehicle C become equal to each other is identified. Then, a subset allowed to contain the "common vehicle cabin inner space" on which determination of whether the portable device 2 is located in the inside of the vehicle cabin or in the outside of the vehicle cabin is to be performed is extracted from the whole set. Then, an approximated curve of the extracted subset is acquired by polynomial approximation employing the least square method. Details are as follows.

In generation of the polynomial for discriminating whether the portable device 2 is located within or without the second domain 62, first, by using the sample group characterizing the inner side of the second domain 62 and the sample group characterizing the outer side of the second domain 62, the whole set of the points where the statistical distances from these sample groups become equal to each other is acquired. At that time, in order that the whole set may be plotted on a two-dimensional plane, each sample acquired on the inner side and the outer side of the second domain 62 is premised to be of a two-dimensional sample containing two received signal strengths. The whole set contains a subset 3 and a subset 4 of the points located on the two curves illustrated in FIG. 17B.

In order that the second domain 62 may contain the "common vehicle cabin inner space" on which the vehicle cabin inside-or-outside determination of the portable device 2 is to be performed, the subset 3 alone is extracted from the subset 3 and the subset 4 which are the set of the points illustrated in FIG. 17B where the statistical distances are equal to each other. The domain distinguished by the subset 3 becomes as illustrated in FIGS. 6A and 6B and hence the domain finally becomes the second domain 62 containing the "common vehicle cabin inner space" on which determination of whether the portable device 2 is located in the inside or the outside is to be performed.

A polynomial for the subset 3 extracted from FIG. 17B is acquired by the least square method and then employed as the polynomial for determining the inside or the outside of the second domain 62. The discriminant for the inside-or-outside determination of the portable device 2 in the second domain 62 is expressed by the formula (7) given above.

Figure 18:
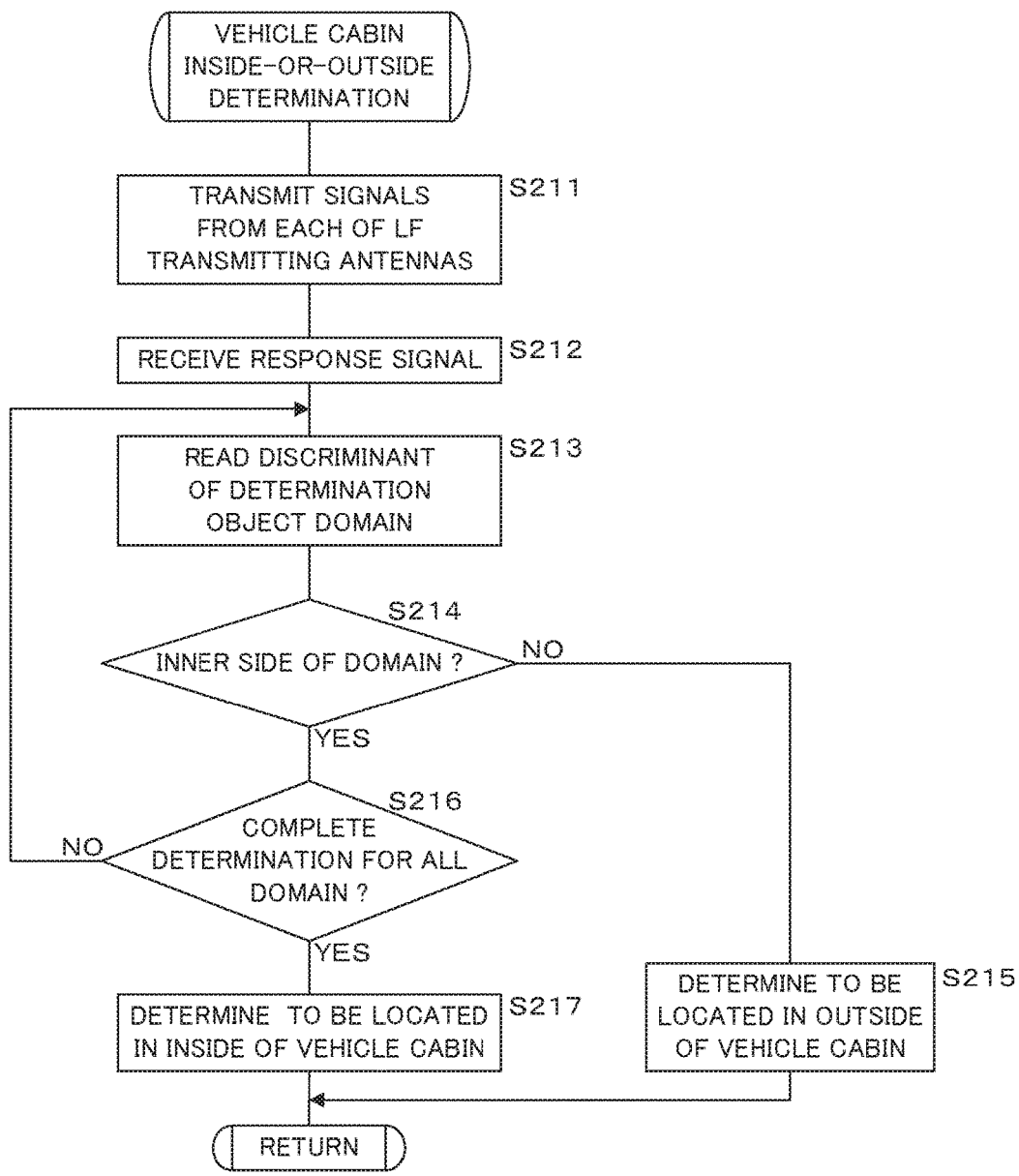
FIG. 18 is a flow chart illustrating a processing procedure of a vehicle cabin inside-or-outside determination subroutine in Embodiment 2.

FIG. 18 is a flow chart illustrating a processing procedure of the vehicle cabin inside-or-outside determination subroutine in Embodiment 2. At step S211 to step S212, the in-vehicle device 1 executes processing (step S111 to step S112) concerning the measurement of the received signal strength and the receiving of the response signal similar to those of Embodiment 1.

Then, the control part 11 of the in-vehicle device 1 reads from the storage part 14 the discriminant of one domain among the first to the fourth domain 61, 62, 63, and 64 (step S213). Then, by using the received signal strengths contained in the received response signals and the discriminant read at step S215, the control part 11 performs the inside-or-outside determination of the portable device 2 in the one domain (step S214). For example, in a case that the received signal strength vector is of two dimensions, a function value Y obtained such that one received signal strength contained in the response signal is substituted into $X^1$ of the formula (7) given above is compared with another received signal strength contained in the response signal so that the inside-or-outside determination is performed.

Then, processing similar to that of Embodiment 1 concerning the inside-or-outside determination of the portable device 2 in each domain and the vehicle cabin inside-or-outside determination (step S117 to step S119) is executed at step S215 to step S217.

Figure 19:
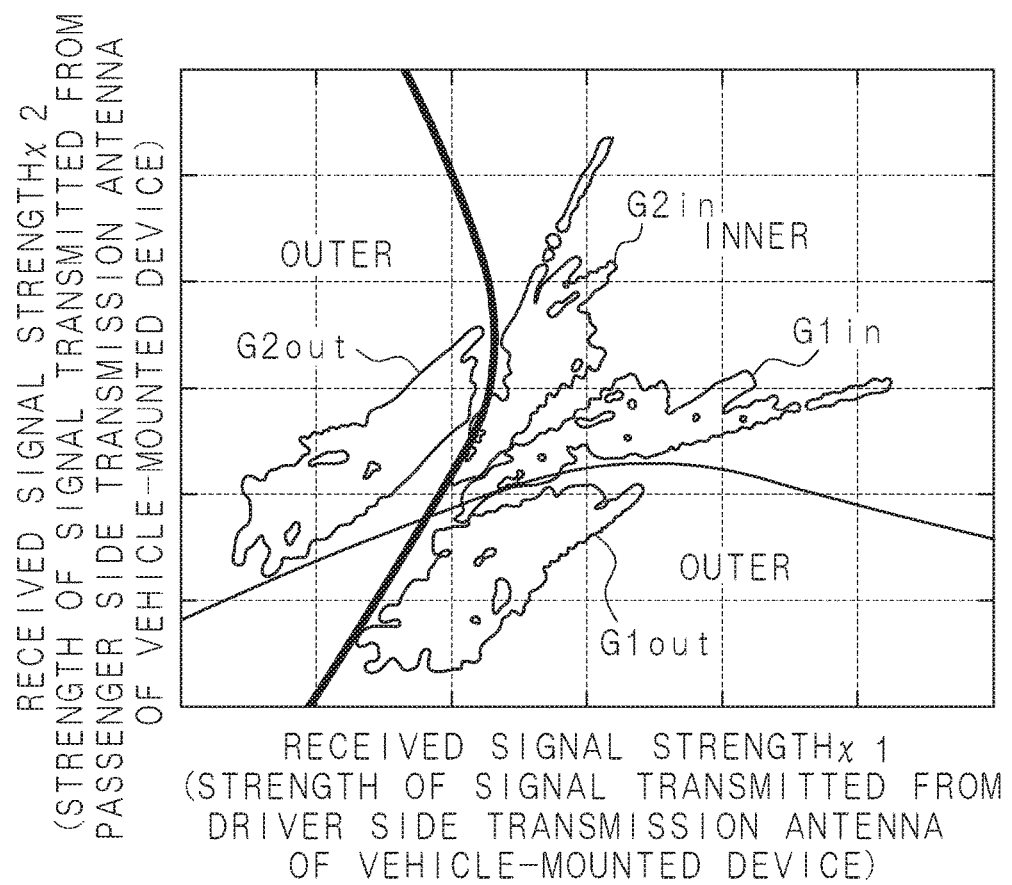
FIG. 19 is a graph illustrating the curve of a discriminant and a distribution of received signal strengths according to Embodiment 2.

FIG. 19 is a graph illustrating the curve of a discriminant and the distribution of the received signal strengths according to Embodiment 2. The graph of FIG. 19 is similar to the graph of FIG. 12. Further, the regions G1out, G1in, G2out, and G2in are also similar to those described in FIG. 12.

The thin line indicates a boundary by which the inside and the outside are distinguished from each other in accordance with the discriminant polynomial concerning the first domain 61. Then, the lower side of the thin line corresponds to the outer side of the first domain 61 and the upper side of the thin line corresponds to the inner side of the first domain 61. By virtue of the approximated curve corresponding to the thin line, the regions G1out and G1in of the received signal strengths measured in the vehicle cabin outside and the vehicle cabin inside on the driver side are accurately distinguished from each other.

The thick line indicates a boundary by which the inside and the outside are distinguished from each other in accordance with the polynomial of discriminant concerning the second domain 62. Then, the left side of the thick line corresponds to the outer side of the second domain 62 and the right side of the thick line corresponds to the inner side of the second domain 62. By virtue of the approximated curve corresponding to the thick line, the regions G2out and G2in of the received signal strengths measured in the vehicle cabin outside and the vehicle cabin inside on the passenger side are accurately distinguished from each other.

By virtue of the discriminant polynomials corresponding to the thin line and the thick line, the regions G1in and G2in of the received signal strengths measured in the inside of the vehicle cabin are allowed to be distinguished from the received signal strengths G1out and G2out measured in the outside of the vehicle cabin.

As described above, according to the vehicle-use communication system and the in-vehicle device 1 of the present Embodiment 2, the inside-or-outside determination of the portable device 2 in the first domain 61 and the second domain 62 is performed by using the polynomials adjusted such that each domain contains the common vehicle cabin inner space. This permits more accurate determination of whether the portable device 2 is located within or without the vehicle cabin inner space, than in Embodiment 1. Further, similarly to Embodiment 1, the number of processes required for generation of the discriminant is allowed to be suppressed.

Here, the dimension and the form of each discriminant according to the present Embodiment 2 are not limited to particular ones.

As described above, the vehicle cabin inside-or-outside determination of the portable device 2 is allowed to be accurately performed on the boundaries of the side face on the driver side and of the side face on the passenger side. However, when required, the inside-or-outside determination on any other boundary may be added in accordance with a similar technique. For example, a configuration may be employed that the third domain 63 and the fourth domain 64 that follow the vehicle rear boundary and the vehicle front boundary are added and then the inside-or-outside determination of the portable device 2 is performed on the first to the fourth domain 61, 62, 63, and 64. In this case, the vehicle cabin inside-or-outside determination of whether the portable device 2 is located within or without the "common vehicle cabin inner space" is allowed to be realized accurately on the side face boundary on the driver side, the side face boundary on the passenger side, the vehicle rear boundary, and the vehicle front boundary.

(Modification 2)

The present Embodiment 2 has been described for an example that the in-vehicle device 1 performs the vehicle cabin inside-or-outside determination of the portable device 2. Instead, a configuration may be employed that the portable device 2 itself performs the vehicle cabin inside-or-outside determination. The configuration of the vehicle-use communication system according to Modification 2 is similar to the configuration of Embodiment 2 and hence the in-vehicle device 1 and the portable device 2 are provided. In the portable device 2 of Modification 2, the storage part 24 stores a discriminant used for performing the inside-or-outside determination of the portable device 2 in the first to the fourth domain 61, 62, 63, and 64 and a computer program of the present patent disclosure. In the vehicle-use communication system of Modification 2, the processing of step S211 to step S217 described in FIG. 18 is executed by the control part 11 of the portable device 2 and then the vehicle cabin inside-or-outside determination result is transmitted to the in-vehicle device 1.

According to Modification 2, similarly to the present Embodiment 2, when the inside-or-outside determination of the portable device 2 is performed in the first domain 61 and the second domain 62, whether the portable device 2 is located within or without the vehicle cabin inner space is allowed to be accurately determined. The other effects are similar to those of Embodiments 1 and 2.

Embodiment 3

In the vehicle-use communication system according to the present Embodiment 3, the vehicle cabin inside-or-outside determination similar to Embodiment 1 is performed by using a part of the received signal strengths suitable for the inside-or-outside determination in the first to the fourth domain 61, 62, 63, and 64 among the received signal strengths contained in the response signals. In the vehicle-use communication system and the computer program according to Embodiment 3, the contents of the statistical values stored in the storage part 14 of the in-vehicle device 1 and the processing procedure of the control part 11 are different from those of Embodiment 1. Thus, the following description is given mainly for these differences. The other configurations and operation effects are similar to those of Embodiment 1. Thus, corresponding parts are designated by like numerals and then detailed description is not given.

Similarly to Embodiment 1, the storage part 14 stores the first statistical values and the second statistical values of each of the first to the fourth domain 61, 62, 63, and 64. However, the received signal strengths of the sample group used for calculation of the individual statistical values are different depending on each domain. For example, the received signal strength vector has four received signal strengths. However, some received signal strengths improve the accuracy of the inside-or-outside determination of the portable device 2 in the first domain 61, some received signal strengths have no influence, and some received signal strengths degrade the accuracy of the inside-or-outside determination. Thus, the storage part 14 stores the first statistical values and the second statistical values calculated by using different received signal strengths for each of the first to the fourth domain 61, 62, and 63, and 64. For example, as for the first domain 61, the first statistical values and the second statistical values are calculated by using the received signal strengths of the signals transmitted from the second transmitting antenna 32, the third transmitting antenna 33, and the fourth transmitting antenna 34. As for the second domain 62, the first statistical values and the second statistical values are calculated by using the received signal strengths of the signals transmitted from the first transmitting antenna 31, the third transmitting antenna 33, and the fourth transmitting antenna 34. Further, the storage part 14 stores information indicating which receiving signal strengths among the four kinds of received signal strengths are to be employed for the domain inside-or-outside determination for each of the first to the fourth domain 61, 62, and 63, and 64.

Figure 20:
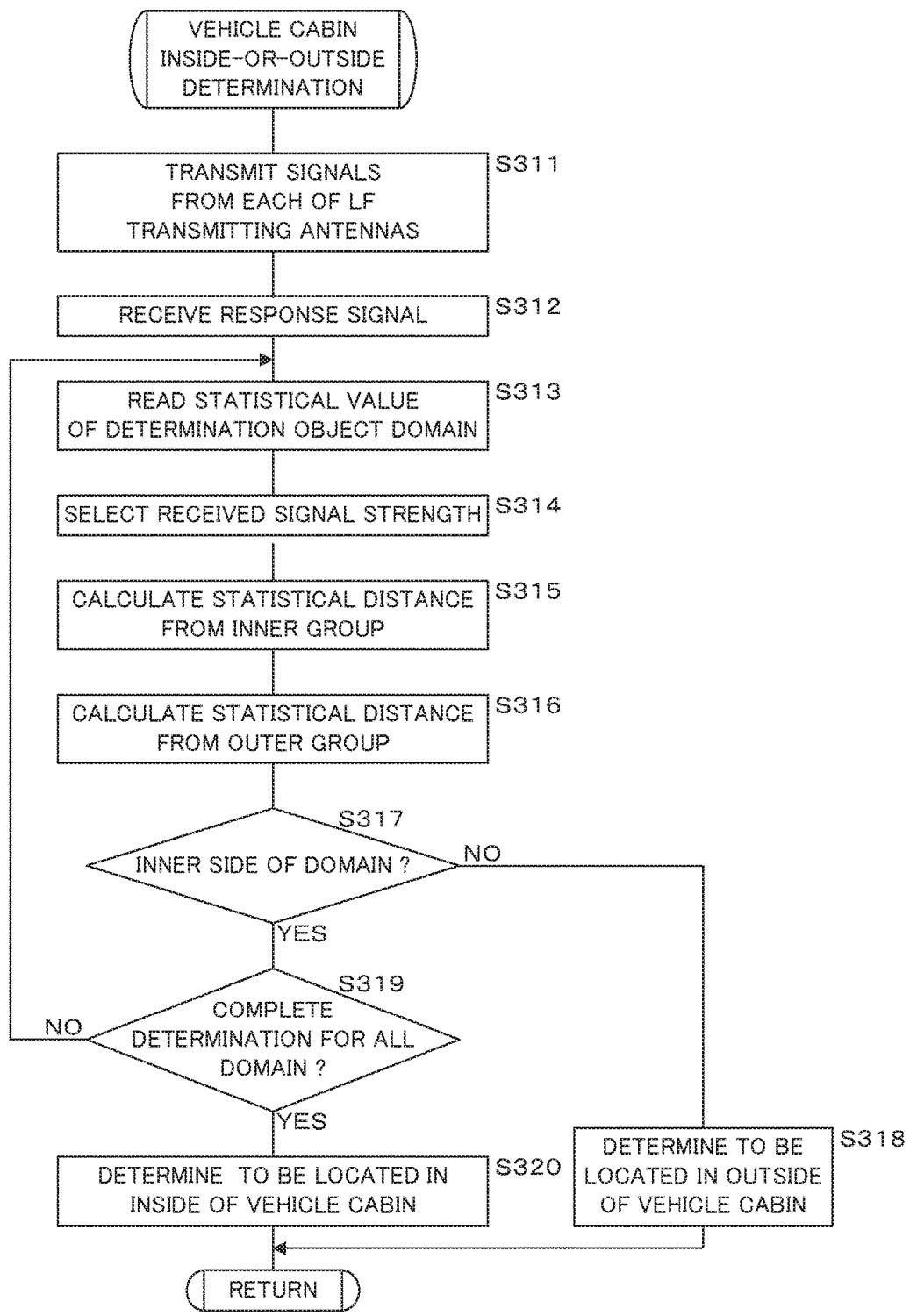
FIG. 20 is a flow chart illustrating a processing procedure of a vehicle cabin inside-or-outside determination subroutine in Embodiment 3.

FIG. 20 is a flow chart illustrating a processing procedure of the vehicle cabin inside-or-outside determination subroutine in Embodiment 3. At step S311 to step S313, the in-vehicle device 1 and the portable device 2 execute the processing similar to that of Embodiment 1 concerning the measurement of the received signal strengths, the receiving of the response signals, and the read-out of the statistical values (step S111 to step S113).

Then, from the received signal strengths contained in the response signals, the control part 11 of the in-vehicle device 1 selects the components to be employed in the inside-or-outside determination of the portable device 2 in the domain serving as a determination object (step S314). Then, by using the received signal strengths selected at step S314, processing similar to that of Embodiment 1 concerning the inside-or-outside determination of the portable device 2 in each domain and the vehicle cabin inside-or-outside determination (step S114 to step S119) is executed at step S311 to step S321.

As described above, the vehicle-use communication system and the in-vehicle device 1 according to the present Embodiment 3 have a configuration that the inside-oroutside determination in each domain is performed by using a part of the components of the received signal strength vector. Thus, the vehicle cabin inside-or-outside determination of the portable device 2 is allowed to be efficiently performed. Further, when the components of the received signal strength vector to be used is reduced, the number of processes of generation of the statistical values used for the inside-or-outside determination of the portable device 2 in each domain is allowed to be suppressed without causing degradation in the accuracy of the vehicle cabin inside-or-outside determination of the portable device 2.

(Modification 3)

The present Embodiment 3 has been described for an example that the in-vehicle device 1 performs the vehicle cabin inside-or-outside determination of the portable device 2. Instead, a configuration may be employed that the portable device 2 itself performs the vehicle cabin inside-or-outside determination. The configuration of the vehicle-use communication system according to Modification 3 is similar to the configuration of Embodiment 3 and hence the in-vehicle device 1 and the portable device 2 are provided. In the portable device 2 of Modification 3, the storage part 24 stores the first statistical values and the second statistical values setting forth the first to the fourth domain 61, 62, 63, and 64 and a computer program of the present patent disclosure. In the vehicle-use communication system of Modification 3, the processing of step S315 to step S321 described in FIG. 20 is executed by the control part 11 of the portable device 2 and then the vehicle cabin inside-or-outside determination result is transmitted to the in-vehicle device 1.

According to Modification 3, similarly to Embodiment 3, a configuration is employed that the inside-or-outside determination in each domain is performed by using a part of the components of the received signal strength vector. Thus, the vehicle cabin inside-or-outside determination of the portable device 2 is allowed to be efficiently performed. The other effects are similar to those of Embodiments 1 and 3.

Embodiment 4

In the vehicle-use communication system according to the present Embodiment 4, the vehicle cabin inside-or-outside determination similar to Embodiment 2 is performed by using a part of the received signal strengths suitable for the inside-or-outside determination in the first to the fourth domain 61, 62, 63, and 64 among the received signal strengths contained in the response signals. In the vehicle-use communication system and the computer program according to Embodiment 4, the contents of the discriminant stored in the storage part 14 of the in-vehicle device 1 and the processing procedure of the control part 11 are different from those of Embodiment 2. Thus, the following description is given mainly for these differences. The other configurations and operation effects are similar to those of Embodiment 2. Thus, corresponding parts are designated by like numerals and then detailed description is not given.

Similarly to Embodiment 2, the storage part 14 stores the discriminant corresponding to each of the first to the fourth domain 61, 62, 63, and 64. However, the received signal strengths of the sample group used for calculation of each discriminant are different depending on each domain. Thus, the storage part 14 stores the discriminant calculated by using received signal strengths different for each of the first to the fourth domain 61, 62, and 63, and 64. For example, as for the first domain 61, the discriminant concerning the first domain 61 is calculated by using the received signal strengths of the signals transmitted from the second transmitting antenna 32, the third transmitting antenna 33, and the fourth transmitting antenna 34. As for the second domain 62, the discriminant concerning the second domain 62 is calculated by using the received signal strengths of the signals transmitted from the first transmitting antenna 31, the third transmitting antenna 33, and the fourth transmitting antenna 34. Further, the storage part 14 stores information indicating which receiving signal strengths among the four kinds of received signal strengths are to be employed for the domain inside-or-outside determination for each of the first to the fourth domain 61, 62, and 63, and 64.

The in-vehicle device 1 and the portable device 2 execute processing similar to that of Embodiment 2 concerning the measurement of the received signal strengths, the receiving of the response signals, and the read-out of the discriminant (step S211 to step S213).

Then, from the received signal strengths contained in the response signals, the control part 11 of the in-vehicle device 1 selects the components to be employed in the inside-or-outside determination of the portable device 2 in the domain serving as a determination object. Then, by using the selected received signal strengths, processing similar to that of Embodiment 2 concerning the inside-or-outside determination of the portable device 2 in each domain and the vehicle cabin inside-or-outside determination (step S214 to step S217) is executed.

As described above, the vehicle-use communication system and the in-vehicle device 1 according to the present Embodiment 4 have a configuration that the inside-or-outside determination in each domain is performed by using a part of the components of the received signal strength vector. Thus, the vehicle cabin inside-or-outside determination of the portable device 2 is allowed to be efficiently performed. Further, when the components of the received signal strength vector to be used is reduced, the number of processes of generation of the discriminant used for the inside-or-outside determination of the portable device 2 in each domain is allowed to be suppressed without causing degradation in the accuracy of the vehicle cabin inside-or-outside determination of the portable device 2.

(Modification 4)

The present Embodiment 4 has been described for an example that the in-vehicle device 1 performs the vehicle cabin inside-or-outside determination of the portable device 2. Instead, a configuration may be employed that the portable device 2 itself performs the vehicle cabin inside-or-outside determination. The configuration of the vehicle-use communication system according to Modification 4 is similar to the configuration of Embodiment 4 and hence the in-vehicle device 1 and the portable device 2 are provided. In the portable device 2 of Modification 4, the storage part 24 stores the discriminant used for the inside-or-outside determination of the portable device 2 in each of the first to the fourth domain 61, 62, 63, and 64 and a computer program of the present patent disclosure. In the vehicle-use communication system of Modification 4, the processing described above is executed by the control part 11 of the portable device 2 and then the vehicle cabin inside-or-outside determination result is transmitted to the in-vehicle device 1.

According to Modification 4, similarly to Embodiment 4, a configuration is employed that the inside-or-outside determination in each domain is performed by using a part of the components of the received signal strength vector. Thus, the vehicle cabin inside-or-outside determination of the portable device 2 is allowed to be efficiently performed. The other effects are similar to those of Embodiments 2 and 4.

The embodiments disclosed above are to be regarded as exemplary at all points and as not restrictive. The scope of the present invention is defined by the scope of the claims rather than the above-described meaning and is intended to include all changes within the scope of the claims and the scope or the meaning equivalent thereto.

The invention claimed is:

1. A vehicle-use communication system comprising; an in-vehicle device transmitting a signal from a plurality of antennas provided on a vehicle; and a portable device receiving the signal transmitted from the in-vehicle device and then transmitting a response signal in accordance with the received signal, wherein the portable device includes:
    a measurement part measuring the received signal strength of the signal transmitted from each of the plurality of antennas; and
    a transmitting part transmitting a response signal containing the received signal strength of each signal measured by the measurement part,
    the in-vehicle device includes:
    an in-vehicle receiving part receiving the response signal transmitted from the portable device;
    a domain inside-or-outside determination part, on the basis of the received signal strengths contained in the response signals received by the in-vehicle receiving part, determining whether the portable device is located within each of a plurality of domains different from each other but each containing a common vehicle cabin inner space;
    a determination part determining whether the portable device is located within every domain; and
    a storage part storing a first statistical value based on a sample group of the received signal strengths measured at a plurality of locations inside the vehicle cabin along a part of an inner surface of the vehicle cabin; and a second statistical value based on a sample group of the received signal strengths measured at a plurality of locations outside the vehicle cabin along a part of the outer surface corresponding to the part of the inner surface, wherein
    the storage part stores, for each of the plurality of domains, the first statistical value based on a sample group inside the vehicle cabin along a part of the inner surface being different for each of the plurality of domains; and the second statistical value based on a sample group outside the vehicle cabin along a part of the outer surface corresponding to the part of the inner surface, and
    the domain inside-or-outside determination part compares the statistical distance between the received signal strengths contained in the response signals received by the in-vehicle receiving part and the sample group concerning the first statistical value; with the statistical distance between the received signal strengths contained in the response signals received by the in-vehicle receiving part and the sample group concerning the second statistical value, so as to determine whether the portable device is located within the domain;
    wherein the first statistical value and the second statistical value include a mean and an inverse variance-covariance matrix of the received signal strengths.

2. The vehicle-use communication system according to claim 1, wherein
    the first statistical value is based on a sample group of the received signal strengths measured at a plurality of locations inside the vehicle cabin along a part of the inner surface; a sample group of the received signal strengths measured at a plurality of locations inside the vehicle cabin along an inner surface of the other part that opposes the part of the inner surface; and a sample group of the received signal strengths measured at a plurality of locations outside the vehicle cabin along an outer surface corresponding to the other part.

3. The vehicle-use communication system according to claim 1, wherein
    the domain inside-or-outside determination part, on the basis of the received signal strengths contained in the response signals received by the in-vehicle receiving part and on the basis of a discriminant setting forth the domain, compares the statistical distance between the received signal strengths contained in the response signals received by the in-vehicle receiving part and a sample group concerning the first statistical value; with the statistical distance between the received signal strengths contained in the response signals received by the in-vehicle receiving part and a sample group concerning the second statistical value, so as to determine whether the portable device is located within the domain.

4. The vehicle-use communication system according to claim 1, wherein
    at least one of the plurality of domains is set forth by a sample group of the received signal strengths measured at a plurality of locations inside the vehicle cabin along the right inner surface of the vehicle cabin and outside the vehicle cabin along the right outer surface of the vehicle; and one of the other domain is set forth by a sample group of the received signal strengths measured at a plurality of locations inside the vehicle cabin along the left inner surface of the vehicle cabin and outside the vehicle cabin along the left outer surface of the vehicle.

5. The vehicle-use communication system according to claim 1, wherein
    at least one of the plurality of domains is set forth by a sample group of the received signal strengths measured at a plurality of locations inside the vehicle cabin along the rear inner surface of the vehicle cabin and outside the vehicle cabin along the rear outer surface of the vehicle.

6. The vehicle-use communication system according to claim 1, wherein
    at least one of the plurality of domains is set forth by a sample group of the received signal strengths measured at a plurality of locations inside the vehicle cabin along the front inner surface of the vehicle cabin and outside the vehicle cabin along the front outer surface of the vehicle.

7. The vehicle-use communication system according to claim 1, wherein
    the domain inside-or-outside determination part is constructed such as to, on the basis of a part of the received signal strengths contained in the response signals received by the in-vehicle receiving part, determine whether the portable device is located within the domain, the received signal strengths employed in the determination being different for each of the plurality of domains.

8. An in-vehicle device transmitting a signal from a plurality of antennas provided on a vehicle and then receiving a response signal transmitted from an external equipment in accordance with the signal, comprising:

an in-vehicle receiving part receiving the response signals containing received signal strengths of the signals individually transmitted from the plurality of antennas measured at the external equipment;

a domain inside-or-outside determination part, on the basis of the received signal strengths contained in the response signals received by the in-vehicle receiving part, determining whether the external equipment is located within each of a plurality of domains different from each other but each containing a common vehicle cabin inner space;

a determination part determining whether the external equipment is located within every domain; and a storage part storing a first statistical value based on a sample group of the received signal strengths measured at a plurality of locations inside the vehicle cabin along a part of an inner surface of the vehicle cabin; and a second statistical value based on a sample group of the received signal strengths measured at a plurality of locations outside the vehicle cabin along a part of the outer surface corresponding to the part of the inner surface, wherein the storage part stores, for each of the plurality of domains, the first statistical value based on a sample group inside the vehicle cabin along a part of the inner surface being different for each of the plurality of domains and the second statistical value based on a sample group outside the vehicle cabin along a part of the outer surface corresponding to the part of the inner surface, and the domain inside-or-outside determination part compares the statistical distance between the received signal strengths contained in the response signals received by the in-vehicle receiving part and the sample group concerning the first statistical value; with the statistical distance between the received signal strengths contained in the response signals received by the in-vehicle receiving part and the sample group concerning the second statistical value, so as to determine whether the external equipment is located within the domain;

wherein the first statistical value and the second statistical value include a mean and an inverse variance-covariance matrix of the received signal strengths.

9. A portable device receiving a plurality of signals transmitted from a vehicle and then transmitting response signals in accordance with the received signals, comprising:

a measurement part measuring received signal strengths of the plurality of signals;

a domain inside-or-outside determination part, on the basis of the received signal strengths measured by the measurement part, determining whether itself is located within each of a plurality of domains different from each other but each containing a common vehicle cabin inner space;

a determination part determining whether itself is located within every domain; and a storage part storing: a first statistical value based on a sample group of the received signal strengths measured at a plurality of locations inside the vehicle cabin along a part of an inner surface of the vehicle cabin; and a second statistical value based on a sample group of the received signal strengths measured at a plurality of locations outside the vehicle cabin along a part of the outer surface corresponding to the part of the inner surface, wherein the storage part stores for each of the plurality of domains, the first statistical value based on a sample group inside the vehicle cabin along a part of the inner surface being different for each of the plurality of domains; and the second statistical value based on a sample group outside the vehicle cabin along a part of the outer surface corresponding to the part of the inner surface, and the domain inside-or-outside determination part compares the statistical distance between the received signal strengths measured by the measurement part and the sample group concerning the first statistical value; with the statistical distance between the received signal strengths measured by the measurement part and the sample group concerning the second statistical value, so as to determine whether itself is located within the domain;

wherein the first statistical value and the second statistical value include a mean and an inverse variance-covariance matrix of the received signal strengths.

10. A non-transitory computer-readable recording medium storing a computer program causing a computer to, on the basis of the received signal strengths of signals transmitted from a plurality of antennas provided on a vehicle and then received by a portable device, determine whether the portable device is located within the vehicle cabin, wherein the computer is caused to serve as:

a domain inside-or-outside determination part, on the basis of the received signal strengths, determining whether the portable device is located within each of a plurality of domains different from each other but each containing a common vehicle cabin inner space; and a determination part determining whether the portable device is located within every domain, wherein the determination part is caused to compare the statistical distance between the received signal strengths and a sample group concerning a first statistical value based on a sample group of the received signal strengths measured at a plurality of locations inside the vehicle cabin along a part of an inner surface of the vehicle cabin; with the statistical distance between the received signal strengths and a sample group concerning a second statistical value based on a sample group of the received signal strengths measured at a plurality of locations outside the vehicle cabin along a part of the outer surface corresponding to the part of the inner surface, so as to determine whether the portable device is located within the domain by using the first statistical value based on a sample group inside the vehicle cabin along a part of the inner surface being different for each of the plurality of domains and the second statistical value based on a sample group outside the vehicle cabin along a part of the outer surface corresponding to the part of the inner surface;

wherein the first statistical value and the second statistical value include a mean and an inverse variance-covariance matrix of the received signal strengths.

* * * * *